(12) United States Patent
Imomoto et al.

(10) Patent No.: US 10,785,404 B2
(45) Date of Patent: Sep. 22, 2020

(54) INFORMATION PROCESSING METHOD, INFORMATION PROCESSING APPARATUS, AND NON-TRANSITORY RECORDING MEDIUM

(71) Applicant: Panasonic Intellectual Property Corporation of America, Torrance, CA (US)

(72) Inventors: Seiya Imomoto, Hyogo (JP); Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 29 days.

(21) Appl. No.: 16/191,497

(22) Filed: Nov. 15, 2018

(65) Prior Publication Data

US 2019/0082099 A1   Mar. 14, 2019

Related U.S. Application Data

(63) Continuation of application No. PCT/JP2018/010955, filed on Mar. 20, 2018.

(30) Foreign Application Priority Data

Jul. 27, 2017 (JP) ................................ 2017-145085
Mar. 1, 2018 (JP) ................................ 2018-036598

(51) Int. Cl.
*H04N 7/18* (2006.01)
*H04N 5/232* (2006.01)
(Continued)

(52) U.S. Cl.
CPC ..... *H04N 5/23218* (2018.08); *G06K 9/00791* (2013.01); *H04N 5/232* (2013.01);
(Continued)

(58) Field of Classification Search
CPC ...... A61B 5/150389; A61M 2005/004; A61M 2005/312; A61M 5/002; A61M 5/3243;
(Continued)

(56) References Cited

U.S. PATENT DOCUMENTS

| | | | | |
|---|---|---|---|---|
| 7,856,311 B2 * | 12/2010 | Matsuura | ........... | G01C 21/3679 701/424 |
| 10,453,004 B2 * | 10/2019 | Davidson | ......... | G06Q 10/08355 |

(Continued)

FOREIGN PATENT DOCUMENTS

| | | |
|---|---|---|
| JP | 2011-242190 | 12/2011 |
| JP | 2013-117777 | 6/2013 |
| WO | 2007/067772 A2 | 6/2007 |

OTHER PUBLICATIONS

International Search Report of PCT application No. PCT/JP2018/010955 dated Jun. 26, 2018.
(Continued)

*Primary Examiner* — Gims S Philippe
(74) *Attorney, Agent, or Firm* — Greenblum & Bernstein, P.L.C.

(57) ABSTRACT

An information processing method obtains location information indicating a location of a moving body at a time of detection of occurrence of a predetermined event that triggers recording of a photographic image acquired by photography using a photographic apparatus installed on the moving body. Then, the method determines whether or not the location indicated by the location information is a location where the driver is estimated to have visited a plurality of times, based on at least one of action history information indicating action history of a driver of the moving body and related-person information regarding a related person of the driver. Finally, the method controls to record the photographic image, according to the determination of whether or not the location indicated by the location (Continued)

information is a location where the driver is estimated to have visited a plurality of times.

13 Claims, 19 Drawing Sheets

(51) Int. Cl.
*G06K 9/00* (2006.01)
*H04W 4/029* (2018.01)
*G01C 21/36* (2006.01)
*H04W 4/40* (2018.01)

(52) U.S. Cl.
CPC ........ *H04W 4/029* (2018.02); *G01C 21/3647* (2013.01); *G01C 21/3694* (2013.01); *H04W 4/40* (2018.02)

(58) Field of Classification Search
CPC .. A61M 5/3298; A61M 5/3205; H04N 5/232; H04N 5/23218
USPC ........................................................ 348/148
See application file for complete search history.

(56) References Cited

U.S. PATENT DOCUMENTS

| | | | |
|---|---|---|---|
| 2006/0149684 A1* | 7/2006 | Matsuura | G06Q 20/367 705/65 |
| 2010/0100507 A1* | 4/2010 | Davidson | G06Q 10/08 705/412 |
| 2010/0185486 A1* | 7/2010 | Barker | G06Q 30/0202 705/7.31 |
| 2011/0060496 A1* | 3/2011 | Nielsen | G06Q 10/0631 701/31.4 |
| 2015/0191122 A1 | 7/2015 | Roy et al. | |
| 2015/0211870 A1* | 7/2015 | Nickolaou | G01C 21/34 701/28 |
| 2015/0242868 A1* | 8/2015 | Perelmutov | G01C 21/3679 705/7.34 |
| 2017/0200333 A1* | 7/2017 | Plante | G06Q 10/00 |
| 2018/0033327 A1* | 2/2018 | Nishijima | G09B 9/042 |
| 2018/0075309 A1* | 3/2018 | Sathyanarayana | H04N 5/247 |
| 2018/0096433 A1* | 4/2018 | Belz | G06Q 50/30 |
| 2018/0262724 A1* | 9/2018 | Ross | H04N 7/188 |
| 2019/0178183 A1* | 6/2019 | Hu | F02D 41/065 |

OTHER PUBLICATIONS

The Extended European Search Report dated Jul. 2, 2020 for the related European Patent Application No. 18803527.3.

* cited by examiner

INFORMATION PROCESSING METHOD, INFORMATION PROCESSING APPARATUS, AND NON-TRANSITORY RECORDING MEDIUM

BACKGROUND

1. Technical Field

The present disclosure relates to an information processing method, an information processing apparatus, and a non-transitory recording medium that perform processing on photographic images resulting from photography using a photographic apparatus installed on a moving body.

2. Description of the Related Art

Heretofore, event data recorders have been known that determine that a dangerous situation, called a near miss, that does not lead to an accident occurred when the acceleration of a vehicle exceeds a predetermined threshold and that store image information resulting from photography before and after a time when the dangerous situation occurred (e.g., see Japanese Unexamined Patent Application Publication No. 2013-117777).

Also, heretofore, a driving assistance apparatus is known that stores, in a hazard-map storage unit, hazard-map information that is generated based on information collected while a driver was driving a vehicle in the past and in which places where the driver's biometric information varies from a normal state are recorded, that determines that the driver's state is a dangerous state, unless a predetermined change occurs in obtained real-time biometric information of the driver, when an obtained location of the vehicle is a place recorded in the hazard-map information, and that issues a warning for giving a caution to the driver (e.g., see Japanese Unexamined Patent Application Publication No. 2011-242190).

SUMMARY

However, in the technology disclosed in Japanese Unexamined Patent Application Publication No. 2013-117777, the image information stored in the event data recorder may include image information in which a dangerous situation did not occur in practice.

Also, in Japanese Unexamined Patent Application Publication No. 2011-242190, when the current location of the vehicle is a place where the biometric information varied in the past, a determination is made as to whether or not the driver's state is a dangerous state, and when the current location of the vehicle is a place where the biometric information has not varied in the past, no determination is made as to whether or not the driver's state is a dangerous state.

One non-limiting and exemplary embodiment provides an information processing method, an information processing apparatus, and an information processing program that can efficiently collect photographic images showing abnormal situations.

In one general aspect, the techniques disclosed here feature an information processing method including: obtaining location information indicating a location of a moving body at a time of detection of occurrence of a predetermined event that triggers recording of a photographic image acquired by photography using a photographic apparatus installed on the moving body; determining whether or not the location indicated by the location information is a location where the driver is estimated to have visited a plurality of times, based on at least one of action history information indicating action history of a driver of the moving body and related-person information regarding a related person of the driver; and controlling the recording of the photographic image, according to the determination as to whether or not the location indicated by the location information is a location where the driver is estimated to have visited a plurality of times.

According to the present disclosure, it is possible to efficiently collect photographic images showing abnormal situations.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Knowledge Underlying Present Disclosure)

Figure 1:
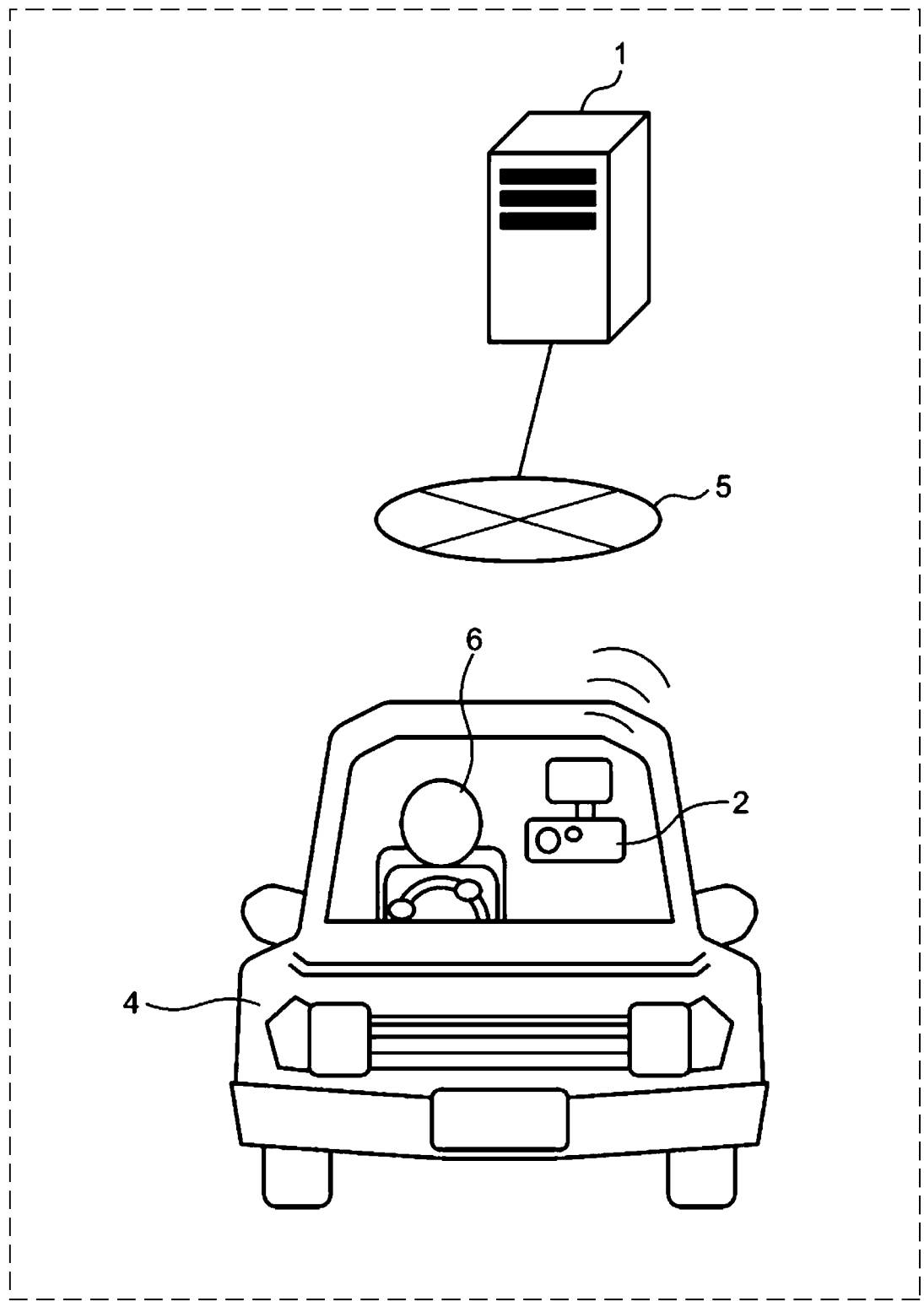
FIG. 1 is a diagram conceptually illustrating an overall configuration of a system in a first embodiment.

An event data recorder of related art simply determines that a dangerous situation occurred in response to a condition that the acceleration of a vehicle exceeded a predetermined threshold even once, and thus, even when a large acceleration is temporarily detected owing to noise or disturbance during traveling, there is a possibility that it is determined that a dangerous situation occurred.

Thus, image information stored in the event data recorder of the related art may also include image information in which a dangerous situation did not occur in practice.

Also, in the driving assistance apparatus of the related art, when the current location of the vehicle is a place where the biometric information varied in the past, a determination is made as to whether or not the state of the driver is a dangerous state, and when the current location of the vehicle is a place where the biometric information has not varied in the past, the determination as to whether or not the driver's state is a dangerous state is not made.

Thus, in places where the driver is not accustomed to traveling, and a predetermined event, such as sudden braking, is likely to occur, like places where the biometric information varied in the past, a determination is made as to whether or not the driver's state is a dangerous state, but in places where the driver is accustomed to driving, and a predetermined event, such as sudden braking, is less likely to occur, like places where the biometric information did not vary in the past, the determination as to whether or not the driver's state is a dangerous state is not made.

In order to overcome the above-described problems, an information processing method according to one aspect of the present disclosure includes: obtaining location information indicating a location of a moving body at a time of detection of occurrence of a predetermined event that triggers recording of a photographic image acquired by photography using a photographic apparatus installed on the moving body; determining whether or not the location indicated by the location information is a location where the driver is estimated to have visited a plurality of times, based on at least one of action history information indicating action history of a driver of the moving body and related-person information regarding a related person of the driver; and controlling the recording of the photographic image, according to the determination as to whether or not the location indicated by the location information is a location where the driver is estimated to have visited a plurality of times.

According to this configuration, the location information indicating the location of the moving body at the time of detection of occurrence of a predetermined event that triggers recording of a photographic image acquired by photography using the photographic apparatus installed on the moving body is obtained. Based on at least one of the action history information indicating the action history of the driver of the moving body and the related-person information regarding a related person of the driver, a determination is made as to whether or not the location indicated by the location information is a location where the driver is estimated to have visited a plurality of times. The recording of the photographic image is controlled according to the determination as to whether or not the location indicated by the location information is a location where the driver is estimated to have visited a plurality of times.

Accordingly, when the location of the moving body at the time of detection of occurrence of a predetermined event is a location where the driver is estimated to have visited a plurality of times, it is possible to estimate that the predetermined event occurred at a place where the driver is accustomed to traveling. In this manner, when the predetermined event occurred at a place where the driver is accustomed to traveling, it is possible to estimate that the predetermined event occurred since the driver was in an abnormal situation, and photographic images showing an abnormal situation can be collected efficiently, that is, without waste and without exclusion.

The abnormal situation refers to a dangerous situation that does not result in an accident but might have directly led to an accident in some cases and refers to a situation corresponding to the so-called near-miss incident.

Also, in the above-described information processing method, the action history information may include movement history of the moving body; and the determination may include a determining whether or not the location indicated by the location information is a location through which the moving body has passed a plurality of times in the past, based on the movement history of the moving body.

According to this configuration, the action history information includes the movement history of the moving body. Based on the movement history of the moving body, a determination is made as to whether or not the location indicated by the location information is a location through which the moving body has passed a plurality of times in the past.

Accordingly, when it is determined that the location indicated by the location information is a location through which the moving body has passed a plurality of times in the past, based on the movement history of the moving body, it is possible to estimate that the predetermined event occurred at a place where the driver is accustomed to traveling.

Also, in the above-described information processing method, the action history information may include a route or destination pre-registered in the moving body; and the determination may include determining whether or not the location indicated by the location information exists on a location that exists on the route or whether or not the location indicated by the location information is a location that exists within a predetermined range from the destination.

According to this configuration, the action history information includes a route or destination pre-registered in the moving body. A determination is made as to whether or not the location indicated by the location information is a location that exists on the route or whether or not the location indicated by the location information is a location that exists within a predetermined range from the destination.

Accordingly, when it is determined that the location indicated by the location information is a location that exists on the route pre-registered in the moving body, or when it is determined that the location indicated by the location information is a location that exists within a predetermined range from the destination pre-registered in the moving body, it is possible to estimate that the predetermined event occurred at a place where the driver is accustomed to traveling.

Also, in the above-described information processing method, the action history information may include movement history of the driver; and the determination may include determining whether or not the location indicated by the the location information is a location through which the driver has passed a plurality of times in the past, based on the movement history of the driver.

According to this configuration, the action history information includes the movement history of the driver. A determination as to whether or not the location indicated by the location information is a location where the driver has passed a plurality of times in the past is made based on the movement history of the driver.

Accordingly, when it is determined that the location indicated by the location information is a location through which the driver has passed a plurality of times in the past, based on the movement history of the driver, it is possible to estimate that the predetermined event occurred at a place where the driver is accustomed to traveling.

Also, in the above-described information processing method, the action history information may include an execution place pre-registered as a place where the driver executed a specific action; and the determination may include determining whether or not the location indicated by the location information is a location that exists within a predetermined range from the execution place.

According to this configuration, the action history information includes an execution place pre-registered as a place where the driver executed a specific action. A determination is made as to whether or not the location indicated by the location information is a location that exists within a predetermined range from the execution place.

Accordingly, when it is determined that the location indicated by the location information is a location that exists within a predetermined range from the execution place pre-registered as a place where the driver executed a specific action, it is possible to estimate that the predetermined event occurred at a place where the driver is accustomed to traveling.

Also, in the above-described information processing method, the related-person information may include a dwelling place pre-registered as a place where the related person lives; and the determination may include determining whether or not the location indicated by the location information is a location that exists within a predetermined range from the dwelling place.

According to this configuration, the related-person information includes a dwelling place pre-registered as a place where the related person lives. A determination is made as to whether or not the location indicated by the location information is a location that exists within a predetermined range from the dwelling place.

Accordingly, when it is determined that the location indicated by the location information is a location that exists within the predetermined range from the dwelling place pre-registered as a place where the related person lives, it is possible to estimate that the predetermined event occurred at a place where the driver is accustomed to traveling.

Also, in the above-described information processing method, the recording control of the photographic image may include classifying and recording the photographic image.

According to this configuration, since the photographic image is classified and recorded, it is possible to efficiently collect a photographic image showing an abnormal situation.

Also, in the above-described information processing method, the classifying and recording of the photographic image may include: adding, to the photographic image, a tag indicating that the location is a location where the driver is estimated to have visited a plurality of times, and recording the photographic image, when it is determined that the location indicated by the location information is a location where the driver is estimated to have visited a plurality of times; or adding, to the photographic image, a tag indicating that the location is not a location where the driver is estimated to have visited a plurality of times, and recording the photographic image, when it is not determined that the location indicated by the location information is a location where the driver is estimated to have visited a plurality of times.

According to this configuration, since a tag indicating that a photographic image showing an abnormal situation or a photographic image not showing an abnormal situation is added to the photographic image, referring to the tag makes it possible to distinguish the photographic image showing an abnormal situation.

Also, in the above-described information processing method, the determination may include at least one of a first determination process that determines whether or not the location indicated by the location information is a location through which the moving body has passed a plurality of times in the past, based on movement history of the moving body, a second determination process that determines whether or not the location indicated by the location information is a location that exists on a route pre-registered in the moving body or whether or not the location indicated by the location information is a location that exists within a predetermined range from a destination pre-registered in the moving body, a third determination process that determines whether or not the location indicated by the location information is a location through which the driver has passed a plurality of times in the past, based on movement history of the driver, a fourth determination process that determines whether or not the location indicated by the location information is a location that exists within a predetermined range from a dwelling place pre-registered as a place where the related person lives, and a fifth determination process that determines whether or not the location indicated by the location information is a location that exists within a predetermined range from an execution place pre-registered as a place where the driver executed a specific action; and the recording control of the photographic image may include classifying and recording the photographic image for each determination process that is performed, in accordance with at least one determination result of the first determination process, the second determination process, the third determination process, the fourth determination process, and the fifth determination process.

According to this configuration, at least one of a first determination process that determines whether or not the location indicated by the location information is a location through which the moving body has passed a plurality of times in the past, based on movement history of the moving body, a second determination process that determines whether or not the location indicated by the location information is a location that exists on a route pre-registered in the moving body or whether or not the location indicated by the location information is a location that exists within a predetermined range from a destination pre-registered in the moving body, a third determination process that determines whether or not the location indicated by the location information is a location through which the driver has passed a plurality of times in the past, based on movement history of the driver, a fourth determination process that determines whether or not the location indicated by the location information is a location that exists within a predetermined range from a dwelling place pre-registered as a place where the related person lives, and a fifth determination process that determines whether or not the location indicated by the location information is a location that exists within a predetermined range from an execution place pre-registered as a place where the driver executed a specific action is performed. The photographic image is classified and recorded for each determination process that is performed, in accordance with at least one determination result of the first determination process, the second determination process, the third determination process, the fourth determination process, and the fifth determination process.

Accordingly, when the accuracy of determining whether or not the location indicated by the location information is a location where the driver is estimated to have visited a plurality of times differs for each determination process, an administrator can efficiently extract a photographic image showing an abnormal situation, by checking in which of the first determination process, the second determination process, the third determination process, the fourth determination process, and the fifth determination process an affirmative result was obtained.

Also, in the above-described information processing method, the recording control of the photographic image may include: recording the photographic image when it is determined that the location indicated by the location information is a location where the driver is estimated to have visited a plurality of times; and not recording the photographic image when it is not determined that the location indicated by the location information is a location where the driver is estimated to have visited a plurality of times.

According to this configuration, since only an abnormal situation showing a photographic image is recorded, searching for a photographic image showing an abnormal situation becomes unnecessary. Also, it is possible to suppress an increase in the photographic-image storage capacity.

Also, in the above-described information processing method, time information indicating a time point at which the occurrence of the predetermined event is detected may be obtained; the action history information may include movement history of the moving body and movement time point of the moving body; when it is determined that the location indicated by the location information is a location through which the moving body has passed a plurality of times in the past, a sixth determination process that determines whether or not the time point indicated by the time information is included in a passage time segment determined by the movement time point at which the moving body passed through the location in the past may be performed; and the recording of the photographic image may be controlled according to the determination and the sixth determination process.

According to this configuration, the time information indicating the time point at which occurrence of a predetermined event was detected is obtained. The action history information includes the movement history of the moving body and the movement time point of the moving body. When it is determined that the location indicated by the location information is a location through which the moving body has passed a plurality of times in the past, the sixth determination process is performed that determines whether or not the time point indicated by the time information is included in a passage time segment determined by the movement time point at which the moving body passed through the location in the past. The recording of the photographic image is controlled according to the determination and the sixth determination process.

Accordingly, when it is determined that the time point at which occurrence of a predetermined event was detected is included in a passage time segment determined by the movement time point at which the moving body passed the location in the past, it is possible to estimate that the predetermined event occurred since the driver was in an abnormal situation, and a photographic image showing an abnormal situation can be collected more reliably.

Also, in the above-described information processing method, environment information indicating an external environment of the moving body at the time of the detection of the occurrence of the predetermined event may be obtained; the action history information may include movement history of moving body and the external environment when the moving body moved; when it is determined that the location indicated by the location information is a location where the driver is estimated to have visited a plurality of times, a seventh determination process that determines whether or not the external environment indicated by the environment information matches the external environment when the moving body passed through the location in the past may be performed; and the recording of the photographic image may be controlled according to the determination and the seventh determination process.

According to this configuration, the environment information indicating the external environment of the moving body at the point of detection of occurrence of the predetermined event is obtained. The action history information includes the movement history of the moving body and the external environment when the moving body moved. When it is determined that the location indicated by the location information is a location where the driver is estimated to have visited a plurality of times, the seventh determination process is performed that determines whether or not the external environment indicated by the environment information matches the external environment when the moving body passed through the location in the past. The recording of the photographic image is controlled according to the determination and the seventh determination process.

Accordingly, when it is determined that the external environment of the moving body at the time of detection of occurrence of a predetermined event matches the external environment when the moving body passed through the location in the past, it is possible to estimate that the predetermined event occurred since the driver was in an abnormal situation, and a photographic image showing an abnormal situation can be collected more reliably.

Also, in the above-described information processing method, the environment information may include at least one of information indicating a weather, information indicating whether or not a road through which the moving body passes is congested, or information indicating external brightness of the moving body.

According to this configuration, at least one of the weather, a congestion situation of a road through which the moving body passes, and the external brightness of the moving body can be used as the external environment.

An information processing apparatus according to another aspect of the present disclosure includes: a processor; and a memory storing thereon a computer program. When executed by the processor, the computer program causes the processor to perform operations including: obtaining location information indicating a location of a moving body at a time of detection of occurrence of a predetermined event that triggers recording of a photographic image acquired by photography using a photographic apparatus installed on the moving body; determining whether or not the location indicated by the location information is a location where the driver is estimated to have visited a plurality of times, based on at least one of action history information indicating action history of a driver of the moving body and related-person information regarding a related person of the driver; and controlling the recording of the photographic image, according to the determination as to whether or not the location indicated by the location information is a location where the driver is estimated to have visited a plurality of times.

According to this configuration, the location information indicating the location of the moving body at the time of detection of occurrence of a predetermined event that triggers recording of a photographic image acquired by photography using the photographic apparatus installed on the moving body is obtained. Based on at least one of the action history information indicating the action history of the driver of the moving body and the related-person information regarding the related person of the driver, a determination is made as to whether or not the location indicated by the location information is a location where the driver is estimated to have visited a plurality of times. The recording of the photographic image is controlled according to the determination as to whether or not the location indicated by the location information is a location where the driver is estimated to have visited a plurality of times.

Accordingly, when the location of the moving body at the time of detection of occurrence of a predetermined event is a location where the driver is estimated to have visited a plurality of times, it is possible to estimate that the predetermined event occurred at a place where the driver is accustomed to traveling. Thus, when the predetermined event occurred at a place where the driver is accustomed to traveling, it is possible to estimate that the predetermined event occurred since the driver was in an abnormal situation, and it is possible to efficiently collect a photographic image showing an abnormal situation.

A non-transitory recording medium according to another aspect of the present disclosure stores thereon a computer program, which when executed by the processor, causes the processor to perform operations including: obtaining location information indicating a location of a moving body at a time of detection of occurrence of a predetermined event that triggers recording of a photographic image acquired by photography using a photographic apparatus installed on the moving body; determining whether or not the location indicated by the location information is a location where the driver is estimated to have visited a plurality of times, based on at least one of action history information indicating action history of a driver of the moving body and related-person information regarding a related person of the driver; and controlling the recording of the photographic image, according to the determination as to whether or not the location indicated by the location information is a location where the driver is estimated to have visited a plurality of times.

According to this configuration, the location information indicating the location of the moving body at the time of detection of occurrence of a predetermined event that triggers recording of a photographic image acquired by photography using the photographic apparatus installed on the moving body is obtained. Based on at least one of the action history information indicating the action history of the driver of the moving body and the related-person information regarding the related person of the driver, a determination is made as to whether or not the location indicated by the location information is a location where the driver is esti-mated to have visited a plurality of times. The recording of the photographic image is controlled according to the determination as to whether or not the location indicated by the location information is a location where the driver is estimated to have visited a plurality of times.

Accordingly, when the location of the moving body at the time of detection of occurrence of a predetermined event is a location where the driver is estimated to have visited a plurality of times, it is possible to estimate that the predetermined event occurred at a place where the driver is accustomed to traveling. Thus, when the predetermined event occurred at a place where the driver is accustomed to traveling, it is possible to estimate that the predetermined event occurred since the driver was in an abnormal situation, and it is possible to efficiently collect a photographic image showing an abnormal situation.

Embodiments of the present disclosure will be described below with reference to the accompanying drawings. Each of the embodiments described below is one embodied example of the present disclosure and are not intended to limit the technical scope of the present disclosure.

First Embodiment

In a first embodiment, a description will be given of a method in which location information indicating the location of a moving body at the time of detection of occurrence of a predetermined event that triggers recording of photographic images resulting from photography using a photographic apparatus mounted on the moving body is obtained and a determination is made as to whether or not the location indicated by the location information is a location where the driver of the moving body is estimated to have visited a plurality of times, based on at least one of action history information indicating action history of the driver and related-person information regarding a related person of the driver. The moving body in the first embodiment is a vehicle.

FIG. 1 is a diagram conceptually illustrating an overall configuration of a system in the first embodiment.

The system illustrated in FIG. 1 includes a management apparatus 1 and a photographic apparatus 2 mounted on a vehicle 4. The management apparatus 1 is communicably connected to the photographic apparatus 2 through a communications network 5. The communications network 5 is, for example, the Internet.

The management apparatus 1 is, for example, a server and receives, from the photographic apparatus 2 through the communications network 5, event detection information including the location information indicating the location of the vehicle 4 at the time of detection of occurrence of a predetermined event that triggers recording of photographic images acquired by photography using the photographic apparatus 2 installed on the vehicle 4. Also, the management apparatus 1 determines whether or not the location indicated by the location information included in the event detection information received from the photographic apparatus 2 is a location where the driver is estimated to have visited a plurality of times.

The photographic apparatus 2 is, for example, an event data recorder and is mounted on the vehicle 4. The photographic apparatus 2 photographs a traveling direction of the vehicle 4. Upon being triggered by detection of occurrence of a predetermined event, the photographic apparatus 2 creates event video-recording information including photographic data at a specific time that is based on the time of the detection of the occurrence of the predetermined event. The photographic data is at least one photographic image. Specifically, the photographic apparatus 2 records event video-recording information including photographic data in a third period including a first period from a time of detection of occurrence of a predetermined event to a time that is a predetermined time earlier than the time of the detection and a second period from the time of the detection of the occurrence of the predetermined event to a time that is a predetermined time later than the time of the detection. Also, the photographic apparatus 2 transmits, to the management apparatus 1, the event detection information including the location information indicating the location of the vehicle 4 at the time of the detection of the occurrence of the predetermined event.

The photographic apparatus 2 is not limited to an event data recorder, and it is sufficient as long as the photographic apparatus 2 has a function for photography and a function for recording, upon being triggered by detection of occurrence of a predetermined event, event video-recording information including photographic data in a predetermined period before and after the time of the event occurrence detection. For example, the photographic apparatus 2 may be a smartphone or the like. Also, the photographic apparatus 2 may include a vehicle-mounted camera having a photography function, a recording device for recording, upon being triggered by event occurrence detection, event video-recording information including photographic data in a predetermined period before and after the time of the event occurrence detection, and a communication unit for transmitting the event detection information to the management apparatus 1. The recording device is, for example, a hard disk or the like.

The configurations of the management apparatus 1 and the photographic apparatus 2 will be described below in detail.

Figure 2:
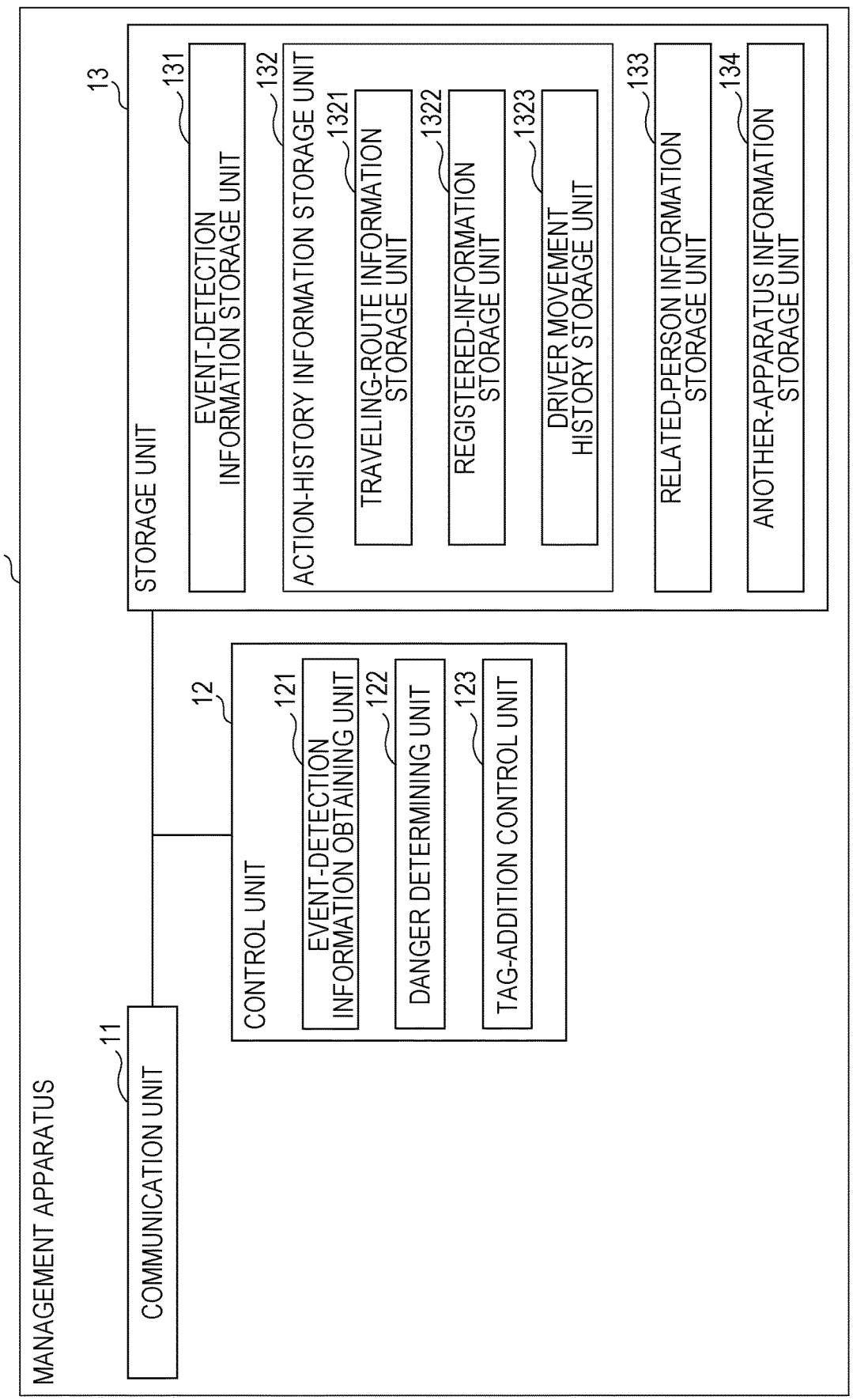
FIG. 2 is a block diagram illustrating the configuration of a management apparatus in the first embodiment.

FIG. 2 is a block diagram illustrating the configuration of the management apparatus in the first embodiment.

The management apparatus 1 includes a communication unit 11, a control unit 12, and a storage unit 13.

By using a wireless or wired channel, the communication unit 11 communicates with an external apparatus, such as the photographic apparatus 2, through the communications network 5, such as the Internet, to transmit/receive information.

The control unit 12 is, for example, a CPU (Central Processing Unit: central computational processing device) and includes an event-detection information obtaining unit 121, a danger determining unit 122, and a tag-addition control unit 123.

The storage unit 13 includes an event-detection information storage unit 131, an action-history information storage unit 132, a related-person information storage unit 133, and an another-apparatus information storage unit 134.

The event-detection information obtaining unit 121 obtains, via the communication unit 11, the event detection information transmitted by the photographic apparatus 2. The event detection information includes event detection location information indicating the location of the vehicle 4 at the time of occurrence of a predetermined event that triggers recording of photographic images acquired by photography using the photographic apparatus 2 installed on the vehicle 4 and event identification information for identifying the predetermined event.

The "predetermined event" as used herein refers to various types of event that occur upon occurrence of a near-miss event that does not result in an accident but might have directly led to an accident in some cases. One example of the predetermined event is an event in which an acceleration exceeds a threshold, the event being caused by a driver's action of suddenly stepping on the brake pedal. Also, another example of the predetermined event is an event in which an amount of change in the steering angle or the yaw rate or roll rate of the vehicle 4 exceeds a threshold, the event being caused by the driver' action of suddenly turning the steering wheel. Also, yet another example of the predetermined event is an event in which the time from releasing the accelerator until depressing the brake pedal falls below a threshold, the event being caused by the driver's action of quickly switching his/her foot from the accelerator to the brake pedal.

The event detection information obtained by the event-detection information obtaining unit 121 is stored in the event-detection information storage unit 131.

Based on at least one of action history information indicating action history of the driver of the vehicle 4 and related-person information regarding a related person of the driver, the danger determining unit 122 determines whether or not an event detection location indicated by the event detection location information is a location where the driver is estimated to have visited a plurality of times.

This makes it possible to estimate that an event that occurs on a route that the driver often uses on a regular basis or in a place through which the driver often passes is due to a dangerous situation that does not result in an accident but might have directly led to an accident in some cases. When a driver suddenly steps on the brake pedal even though he or she is accustomed to the road, this means that the possibility that a dangerous situation occurred is high. Thus, when it is determined that the event detection location is a location where the driver is estimated to have visited a plurality of times, a photographic image resulting from photography at the event detection location can be estimated to be an image showing a dangerous situation.

The action history information indicating the action history of the driver of the vehicle 4 is stored in the action-history information storage unit 132. The action-history information storage unit 132 includes a traveling-route information storage unit 1321, a registered-information storage unit 1322, and a driver movement history storage unit 1323.

The traveling-route information storage unit 1321 stores the movement history of the vehicle 4. Vehicle identification information for identifying the vehicle 4, past traveling routes of the vehicle 4, and the numbers of times the vehicle 4 has traveled along the respective traveling routes are stored in the traveling-route information storage unit 1321 in association with each other. The vehicle identification information may be photographic-apparatus identification information for identifying the photographic apparatus 2 disposed on the vehicle 4.

Based on the movement history of the vehicle 4, the danger determining unit 122 determines whether or not an event detection location indicated by the event detection location information is a location through which the vehicle 4 has passed a plurality of times in the past. Specifically, the danger determining unit 122 extracts, from the traveling-route information storage unit 1321, a traveling route along which the number of travels is larger than or equal to a predetermined number of times, and determines whether or not the event detection location indicated by the event detection location information exists on the extracted traveling route. Upon determining that the event detection location is a location through which the vehicle 4 has passed a plurality of times in the past, the danger determining unit 122 determines that the event detection location is a location where the driver is estimated to have visited a plurality of times.

A route or destination pre-registered in the vehicle 4 is stored in the registered-information storage unit 1322. A registration route pre-registered in a car navigation apparatus disposed in the vehicle 4 or a destination pre-registered in the car navigation apparatus disposed in the vehicle 4 is stored in the registered-information storage unit 1322. The car navigation apparatus receives the driver's input of a destination, calculates a traveling route from the current location to the destination, and registers the calculated traveling route as a registration route. Also, the car navigation apparatus navigates the driver in accordance with the registration route. The car navigation apparatus transmits the registered registration route or destination to the management apparatus 1. The communication unit 11 in the management apparatus 1 stores the registration route or destination, received from the car navigation apparatus, in the registered-information storage unit 1322. The vehicle identification information for identifying the vehicle 4 and the registered registration route or destination are stored in the registered-information storage unit 1322 in association with each other.

The danger determining unit 122 determines whether or not the event detection location indicated by the event detection location information is a location that exists on the registered registration route or whether or not the event detection location indicated by the event detection location information is a location that exists within a predetermined range from the registered destination. Upon determining that the event detection location is a location that exists on the registered registration route or upon determining that the event detection location is a location that exists within a predetermined range from the registered destination, the danger determining unit 122 determines that the event detection location is a location where the driver is estimated to have visited a plurality of times.

An execution place pre-registered as a place where the driver executed a specific action may be stored in the registered-information storage unit 1322. The execution place is, for example, a place where the driver ate or drank, a place where the driver stayed overnight, a place where the driver did shopping, or the like and is input with the car navigation apparatus or a terminal device. The danger determining unit 122 may determine whether or not the event detection location indicated by the event detection location information is a location that exists within a predetermined range from the execution place. Upon determining that the event detection location is a location that exists within the predetermined range from the execution place, the danger determining unit 122 determines that the event detection location is a location where the driver is estimated to have visited a plurality of times.

The movement history of the driver is stored in the driver movement history storage unit 1323. The movement history of the driver is obtained by a terminal device possessed by the driver. The terminal device is, for example, a smartphone, a tablet computer, or a wearable device. The terminal device includes a location measuring unit, such as a GPS (Global Positioning System) receiver, to measure location information of the terminal device, that is, location information of the driver who possesses the terminal device. The terminal device periodically measures the location information of the driver and transmits a movement route of the driver to the management apparatus 1 as the movement history of the driver. The communication unit 11 in the management apparatus 1 stores the movement history of the driver, the movement history being received from the terminal device, in the driver movement history storage unit 1323. Driver identification information for identifying the driver, past movement routes of the driver, and the numbers of times the driver has moved along the respective movement routes are stored in the driver movement history storage unit 1323 in association with each other.

Movement routes along which the driver moved in the vehicle and movement routes along which the driver moved after getting out of the vehicle may be distinctively stored in the driver movement history storage unit 1323, based on driver mode information added to the location information. For example, location information measured in a state in which a driver mode of the terminal device is on is processed as information about a movement route along which the driver moved in the vehicle. Also, location information measured in a state in which the driver mode of the terminal device is off is processed as information about a movement route along which the driver moved on foot. Processing, described below, in the danger determining unit 122 may be performed using only the movement routes along which the driver moved in the vehicle.

Based on the movement history of the driver, the danger determining unit 122 determines whether or not the event detection location indicated by the event detection location information is a location through which the driver has passed a plurality of times in the past. Specifically, the danger determining unit 122 extracts, from the driver movement history storage unit 1323, the movement route along which the number of movements is larger than or equal to a predetermined number of times and determines whether or not the event detection location indicated by the event detection location information exists on the extracted movement route. Upon determining that the event detection location is a location through which the driver has passed a plurality of times in the past, the danger determining unit 122 determines that the event detection location is a location where the driver is estimated to have visited a plurality of times.

Related-person information regarding a related person of the driver is stored in the related-person information storage unit 133. The related person of the driver is, for example, the driver's friend, relative, lover, or the like and is a person whom the driver frequently meets. The related-person information includes a dwelling place pre-registered as a place where the related person lives. The car navigation apparatus or the terminal device receives the driver's input of the dwelling place of the related person. The car navigation apparatus or the terminal device transmits the input information indicating the dwelling place to the management apparatus 1. The communication unit 11 in the management apparatus 1 stores the information indicating the dwelling place in the related-person information storage unit 133, the information being received from the car navigation apparatus or the terminal device. The driver identification information for identifying the driver and the registered dwelling place of the related person are stored in the related-person information storage unit 133 in association with each other.

The related-person information may be stored automatically. Specifically, the related-person information may be generated from destination information registered in the car navigation apparatus or the like. For example, the destination information registered in the car navigation apparatus is transmitted to the management apparatus 1. When information "friend's home" or the like is included in the destination information as a destination attribute, location information of a location included in the destination information is stored in the related-person information storage unit 133 in association with the driver identification information.

Also, the related-person information may be generated based on a mode (also referred to hereinafter as a "driving mode") in which functions of the terminal device, possessed by the driver, during driving are limited. For example, of the location information received from the terminal device, the location information of a location at which the on and off of the driving mode were switched frequently (e.g., a predetermined number of times or more) is stored in the related-person information storage unit 133 in association with the driver identification information. This is because a site at which the driving mode is frequently switched is estimated to be a site where the driver often gets into or gets out of the vehicle, that is, a site the driver visits often.

The danger determining unit 122 determines whether or not the event detection location indicated by the event detection location information is a location that exists within a predetermined range from the dwelling place of the related person. Upon determining that the event detection location is a location that exists within the predetermined range from the dwelling place of the related person, the danger determining unit 122 determines that the event detection location is a location where the driver is estimated to have visited a plurality of times.

When it is determined that the event detection location indicated by the event detection location information is a location where the driver is estimated to have visited a plurality of times, the tag-addition control unit 123 controls recording of photographic images. When it is determined that the event detection location indicated by the event detection location information is a location where the driver is estimated to have visited a plurality of times, the tag-addition control unit 123 transmits, to the photographic apparatus 2 via the communication unit 11, tag addition instruction information giving an instruction for adding, to the event video-recording information, tag information indicating that photographic data in a predetermined period including a time of occurrence of a predetermined event is photographic data showing a dangerous situation.

Figure 3:
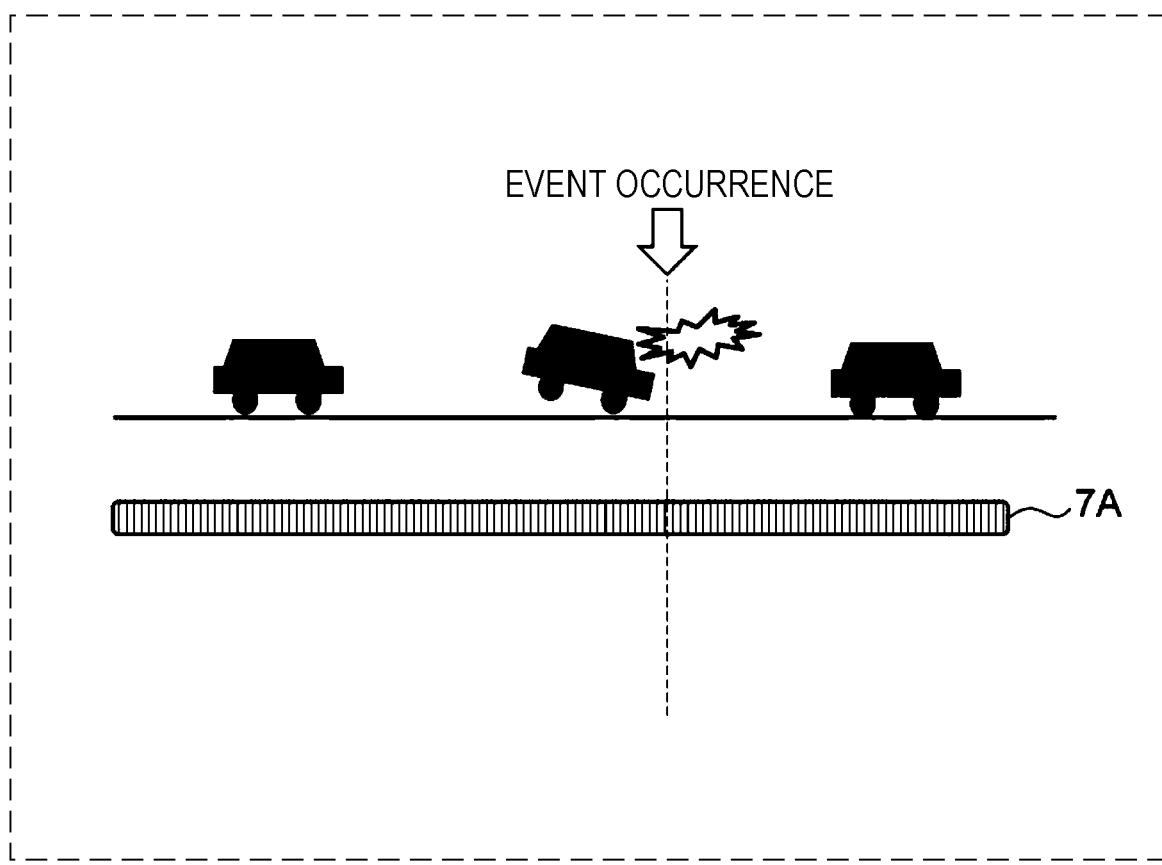
FIG. 3 is a schematic diagram for describing event video-recording information in the first embodiment.

FIG. 3 is a schematic diagram for describing the event video-recording information in the first embodiment. The event video-recording information includes photographic data in a third period 7A including a first period from a time of detection of occurrence of a predetermined event to a time that is a predetermined time earlier than the time of the detection and a second period from the time of the detection of the occurrence of the predetermined event to a time that is a predetermined time later than the time of the detection. The first period is, for example, 10 seconds, the second period is, for example, 5 seconds, and the third period is 15 seconds, which is a total of the first period and the second period. The lengths of the first and second periods are examples and are not limited to the above lengths.

Another-apparatus information regarding another apparatus, such as the photographic apparatus 2, is stored in the another-apparatus information storage unit 134. The another-apparatus information includes, for example, identification information for identifying the photographic apparatus 2.

Next, the configuration of the photographic apparatus 2 will be described in detail.

Figure 4:
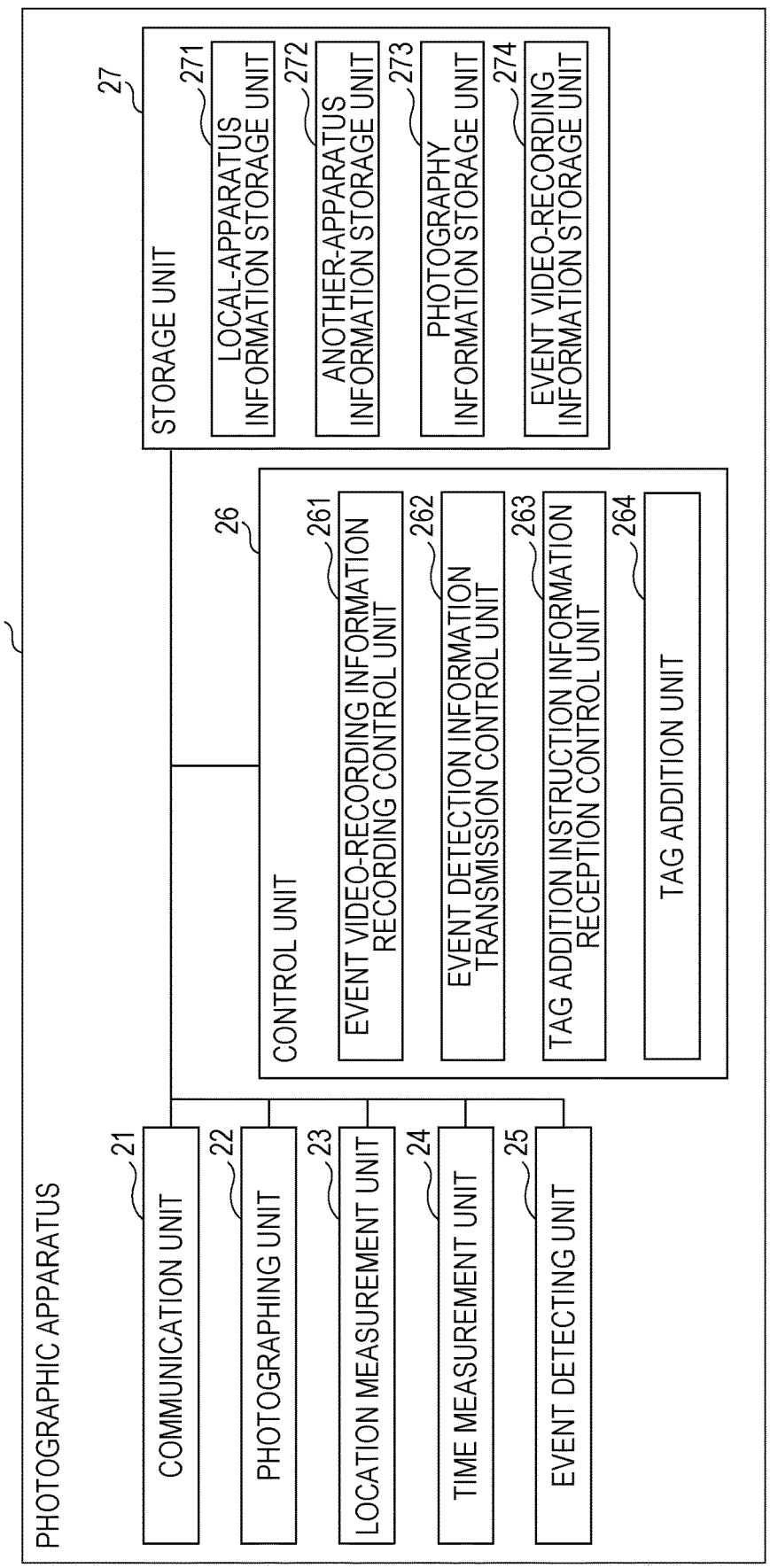
FIG. 4 is a block diagram illustrating the configuration of a photographic apparatus in the first embodiment.

FIG. 4 is a block diagram illustrating the configuration of the photographic apparatus in the first embodiment.

The photographic apparatus 2 includes a communication unit 21, a photographing unit 22, a location measurement unit 23, a time measurement unit 24, an event detecting unit 25, a control unit 26, and a storage unit 27.

By using a wireless channel, the communication unit 21 communicates with the management apparatus 1 through a wireless base station and the communications network 5, such as a WAN (Wide Area Network) and the Internet, to transmit/receive information to/from the management apparatus 1. The communication unit 21 is not limited to this configuration, as long as it can transmit/receive information to/from the management apparatus 1. For example, the communication unit 21 may communicate with the management apparatus 1 via another device, such as a smartphone possessed by the driver, to transmit/receive information to/from the management apparatus 1.

The photographing unit 22 is a camera and is mounted on a vehicle to photograph the vehicle or the surroundings of the vehicle. The photographing unit 22 stores photographic data resulting from the photography in a photography information storage unit 273 periodically (e.g., once every 30 milliseconds).

The location measurement unit 23 is, for example, a GPS receiver and measures location information of the photographic apparatus 2, that is, location information of the vehicle. For example, the location information measured by the location measurement unit 23 is utilized as the location information of the photographic apparatus 2 at a time when the event detecting unit 25 detects a predetermined event. The location information of the photographic apparatus 2 at a time when the event detecting unit 25 detects a predetermined event is added to the event detection information as the event detection location information.

The time measurement unit 24 is, for example, a clock and measures the current time point. The time-point information measured by the time measurement unit 24 is utilized as, for example, time-point information at a time when the event detecting unit 25 detects a predetermined event. The time-point information at a time when the event detecting unit 25 detects a predetermined event is added to the event video-recording information as event detection time-point information.

The event detecting unit 25 detects occurrence of a predetermined event. The predetermined event is pre-set by the driver, an administrator of the vehicle, or the like. In the case of an example of an event in which an acceleration exceeds a threshold, the event being caused by the driver's action of suddenly stepping on the brake pedal, the event detecting unit 25 detects that the acceleration exceeds the threshold.

Also, in another example, in the case of an example of an event in which the amount of change in the steering angle exceeds a threshold, the event being caused by the driver's action of suddenly turning the steering wheel, the event detecting unit 25 detects that the amount of change in the steering angle exceeds the threshold. Also, in another example, in the case of an example of an event in which the time from releasing the accelerator until depressing the brake pedal falls below a threshold, the event being caused by the driver's action of quickly switching his/her foot from the accelerator to the brake pedal, the event detecting unit 25 detects that the time from releasing the accelerator until depressing the brake pedal falls below the threshold.

The storage unit 27 is, for example, a semiconductor memory and includes a local-apparatus information storage unit 271, an another-apparatus information storage unit 272, a photography information storage unit 273, and an event video-recording information storage unit 274.

Local-apparatus information indicating information regarding the photographic apparatus 2 is stored in the local-apparatus information storage unit 271. The local-apparatus information includes identification information for identifying at least the photographic apparatus 2. The identification information is added to transmission information when information is transmitted from the photographic apparatus 2 to the management apparatus 1. For example, when the event detection information is transmitted from the photographic apparatus 2 to the management apparatus 1, the communication unit 21 adds the identification information to the event detection information and transmits the event detection information to which the identification information is added. This allows the management apparatus 1 to recognize from which photographic apparatus 2 the event detection information is transmitted.

Another-apparatus information indicating information regarding another apparatus is stored in the another-apparatus information storage unit 272. The Another-apparatus information includes address information of at least the management apparatus 1. During transmission of information to the management apparatus 1, the photographic apparatus 2 uses the address information included in the another-apparatus information.

Photographic data resulting from periodical photography (e.g., once every 30 milliseconds) by the photographing unit 22 is stored in the photography information storage unit 273.

Event video-recording information obtained by adding event detection location information and event detection time-point information to photographic data in a predetermined period before and after a time of detection of occurrence of an event is stored in the event video-recording information storage unit 274 via an event video-recording information recording control unit 261.

The control unit 26 is, for example, a CPU and includes the event video-recording information recording control unit 261, an event detection information transmission control unit 262, a tag addition instruction information reception control unit 263, and a tag addition unit 264.

When the event detecting unit 25 detects occurrence of a predetermined event, the event video-recording information recording control unit 261 obtains the location information of the photographic apparatus 2 from the location measurement unit 23 and also obtains the current time point from the time measurement unit 24. Next, the event video-recording information recording control unit 261 extracts, from the photography information storage unit 273, photographic data in a predetermined period before and after the time of the detection of the occurrence of the event. Then, the event video-recording information recording control unit 261 generates event video-recording information including the obtained location information and time-point information as event detection location information and event detection time-point information, respectively, and also including the extracted photographic data and stores the generated event video-recording information in the event video-recording information storage unit 274.

The event detection information transmission control unit 262 transmits, to the management apparatus 1 via the communication unit 21, event detection information including the location information indicating the location of the vehicle 4 at a time when the event detecting unit 25 detects occurrence of a predetermined event. When the event detecting unit 25 detects occurrence of a predetermined event, the event detection information transmission control unit 262 obtains the location information of the photographic apparatus 2 from the location measurement unit 23. Then, the event detection information transmission control unit 262 generates event detection information including the obtained location information as the event detection location information and transmits the generated event detection information to the management apparatus 1.

The timing at which the event detection information transmission control unit 262 transmits the event detection information to the management apparatus 1 may be any timing. For example, the event detection information transmission control unit 262 may transmit the event detection information to the management apparatus 1 at a timing when the event video-recording information is stored in the event video-recording information storage unit 274. In this case, since the event detection information transmission control unit 262 can transmit the event detection information to the management apparatus 1 at a timing close to real time, the management apparatus 1 can determine whether or not the event video-recording information includes photographic data showing a dangerous situation.

Another example of the timing at which the event detection information is transmitted to the management apparatus 1 may be a timing when a transmission instruction input by the driver is received or may be a periodic timing.

The tag addition instruction information reception control unit 263 receives tag addition instruction information transmitted by the management apparatus 1.

The tag addition unit 264 adds tag information indicating that the photographic data shows a dangerous situation to the event video-recording information. That is, classifying and recording photographic images includes, adding, to the corresponding photographic images, a tag indicating that the event detection location is a location where the driver is estimated to have visited a plurality of times and recording the resulting photographic images, when it is determined that the location indicated by the event detection location information is a location where the driver is estimated to have visited a plurality of times.

The photographic apparatus 2 transmits, to the management apparatus 1, movement history information including the location measured by the location measurement unit 23 and the current time point from the time measurement unit 24. The management apparatus 1 stores the movement history information, received from the photographic apparatus 2, in the traveling-route information storage unit 1321.

<Processing in Management Apparatus 1>

Next, processing in which the management apparatus 1 uses the event detection information obtained from the photographic apparatus 2 to determine whether or not the location of the vehicle at the time of detection of occurrence of a predetermined event is a location where the driver is estimated to have visited a plurality of times and adds tag information to event video-recording information based on the determination result will be described in detail with reference to the flowchart in FIG. 5.

Figure 5:
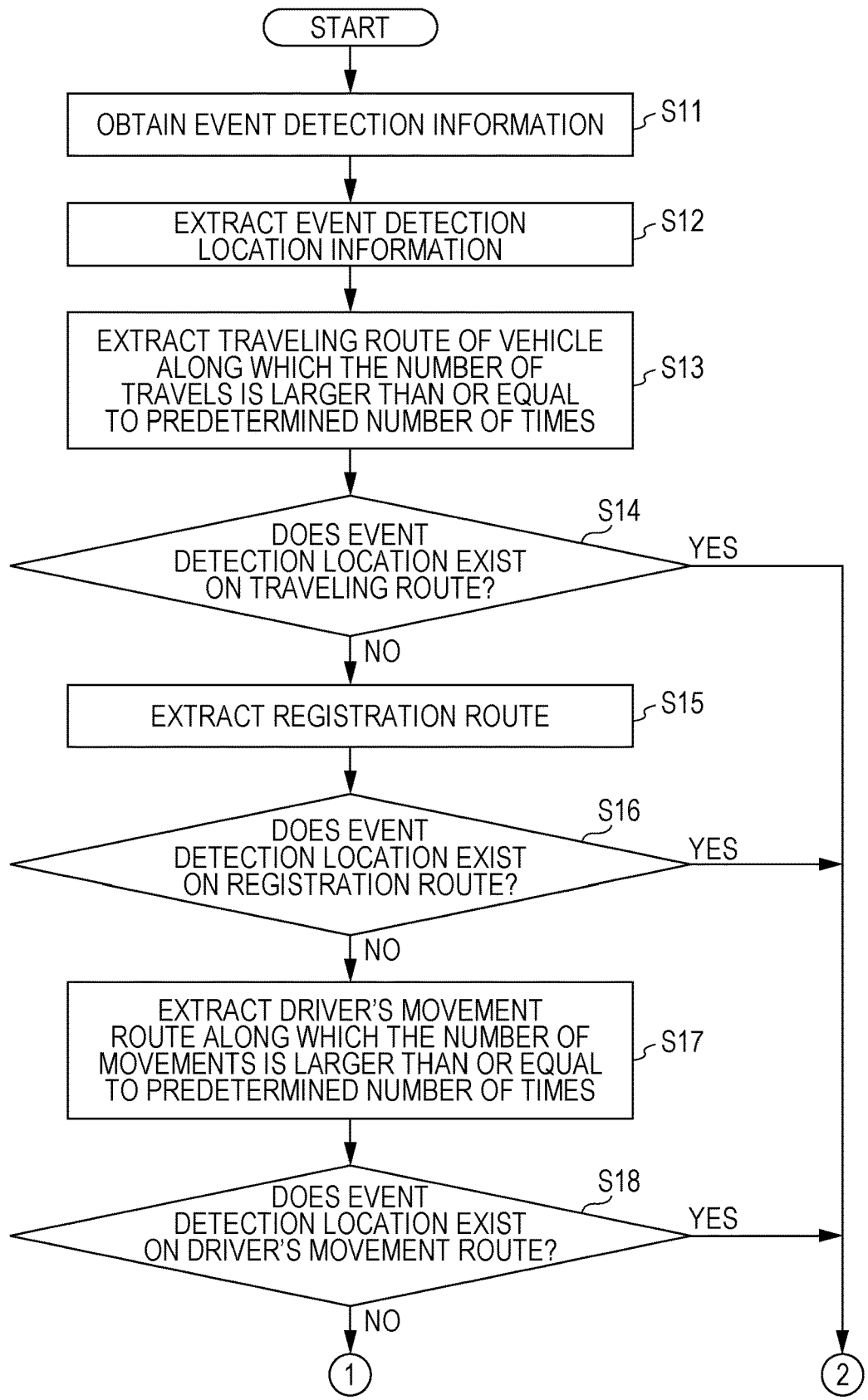
FIG. 5 is a first flowchart for describing processing in the management apparatus in the first embodiment.
Figure 6:
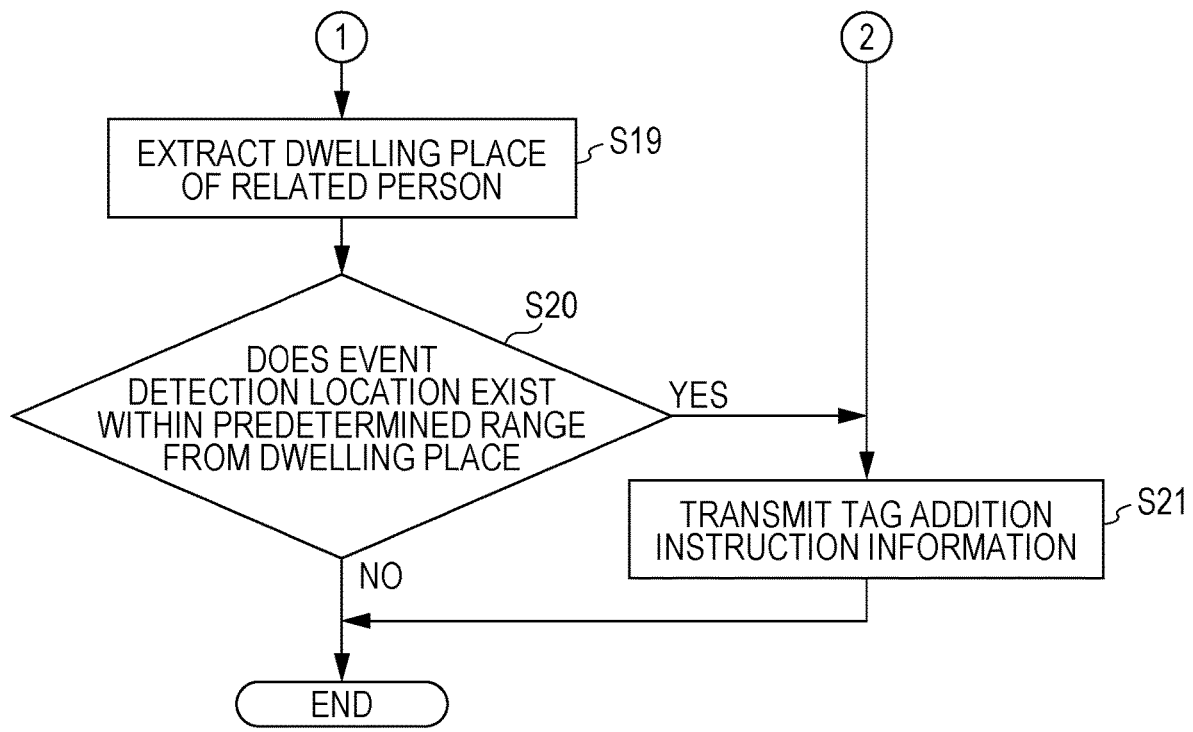
FIG. 6 is a second flowchart for describing processing in the management apparatus in the first embodiment.

FIG. 5 is a first flowchart for describing processing in the management apparatus in the first embodiment, and FIG. 6 is a second flowchart for describing processing in the management apparatus in the first embodiment.

First, the event-detection information obtaining unit 121 in the management apparatus 1 obtains event detection information from the photographic apparatus 2 (step S11). Specifically, the event-detection information obtaining unit 121 obtains, from the photographic apparatus 2 via the communication unit 11, event detection information including event detection location information indicating an event detection location of the vehicle 4 at the time of detection of occurrence of a predetermined event that triggers recording of photographic images acquired by photography using the photographic apparatus 2 installed on the vehicle 4.

Next, the danger determining unit 122 extracts the event detection location information from the event detection information obtained by the event-detection information obtaining unit 121 (step S12).

Next, the danger determining unit 122 extracts, from the traveling-route information storage unit 1321, a traveling route of the vehicle 4 along which the number of travels is larger than or equal to a predetermined number of times (step S13).

Next, the danger determining unit 122 determines whether or not the event detection location indicated by the event detection location information exists on the extracted traveling route of the vehicle 4 (step S14). In this case, when it is determined that the event detection location exists on the traveling route of the vehicle 4, the process proceeds to step S21 (YES in step S14).

Figure 7:
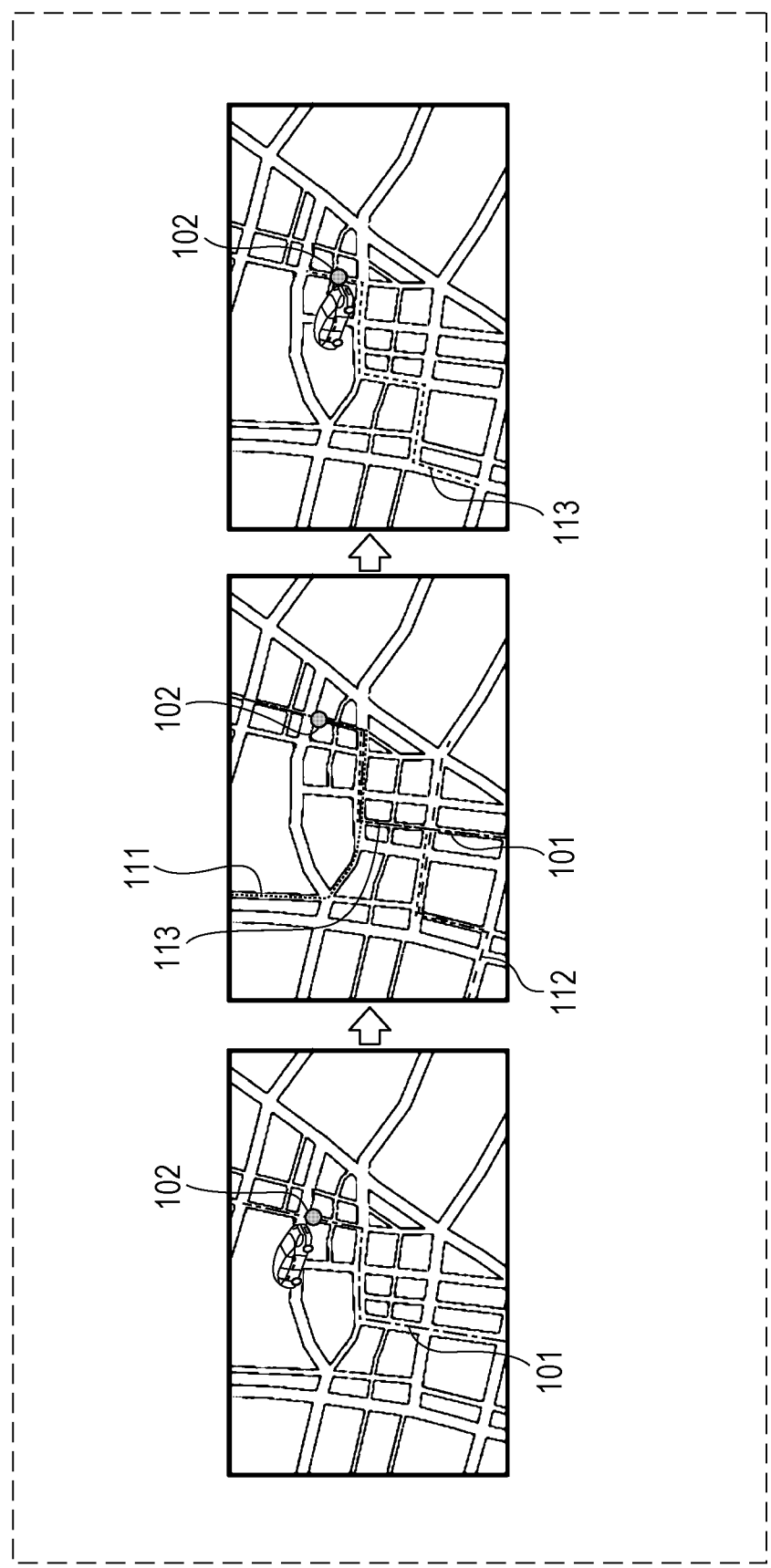
FIG. 7 is a schematic diagram for describing, in the first embodiment, processing for determining whether or not an event detection location exists on a traveling route of a vehicle.

FIG. 7 is a schematic diagram for describing, in the first embodiment, processing for determining whether or not an event detection location exists on a traveling route of the vehicle.

When a predetermined event occurs when the vehicle 4 is traveling on a traveling route 101 in FIG. 7, the event-detection information obtaining unit 121 obtains event detection information including event detection location information indicating an event detection location 102 of the vehicle 4 at the time of detection of the occurrence of the predetermined event that triggers recording of photographic images acquired by photography using the photographic apparatus 2 installed on the vehicle 4.

Subsequently, the danger determining unit 122 extracts, from a plurality of past traveling routes 111, 112, and 113 in the traveling-route information storage unit 1321, the traveling route 113 of the vehicle 4 along which the number of travels is larger than or equal to a predetermined number of times. In FIG. 7, the traveling route 113 is extracted as a traveling route along which the number of travels is larger than or equal to the predetermined number of times.

Then, the danger determining unit 122 determines whether or not the event detection location 102 exists on the extracted traveling route 113 of the vehicle 4. In FIG. 7, the danger determining unit 122 determines that the event detection location 102 exists on the extracted traveling route 113 of the vehicle 4.

On the other hand, when it is determined that the event detection location does not exist on the traveling route of the vehicle 4 (NO in step S14), the danger determining unit 122 extracts a registration route, pre-registered in the car navigation apparatus, from the registered-information storage unit 1322 (step S15).

Next, the danger determining unit 122 decides whether or not the event detection location indicated by the event detection location information exists on the registered registration route (step S16). In this case, when it is determined that the event detection location exists on the registration route (YES in step S16), the process proceeds to step S21.

On the other hand, when it is determined that the event detection location does not exist on the registration route (NO in step S16), the danger determining unit 122 extracts, from the driver movement history storage unit 1323, the driver's movement route along which the number of movements is larger than or equal to a predetermined number of times (step S17). The driver's movement route indicates a movement route when the driver moves in a moving body different from the vehicle 4 or moves on foot.

Next, the danger determining unit 122 determines whether or not the event detection location indicated by the event detection location information exists on the extracted driver's movement route (step S18). In this case, when it is determined that the event detection location exists on the driver's movement route (YES in step S18), the process proceeds to step S21.

On the other hand, when it is determined that the event detection location does not exist on the driver's movement route (NO in step S18), the danger determining unit 122 extracts, from the related-person information storage unit 133, a dwelling place pre-registered as a place where a related person of the driver lives (step S19). The number of extracted dwelling places is not limited to one. A plurality of dwelling places corresponding to a plurality of related people of the driver may also be extracted.

Next, the danger determining unit 122 determines whether or not the event detection location indicated by the event detection location information exists within a predetermined range from the dwelling place of the related person of the driver (step S20). In this case, when it is determined that the event detection location does not exist within the predetermined range from the dwelling place of the related person of the driver (NO in step S20), the event detection location is not a location through which the driver frequently passes, and thus the processing ends.

On the other hand, when it is determined that the event detection location exists on the traveling route of the vehicle 4 (YES in step S14), when it is determined that the event detection location exists on the registration route (YES in step S16), when it is determined that the event detection location exists on the driver's movement route (YES in step S18), or when it is determined that the event detection location is within the predetermined range from the dwelling place of the related person of the driver (YES in step S20), the tag-addition control unit 123 transmits, to the photographic apparatus 2 via the communication unit 11, tag addition instruction information giving an instruction for adding, to the event video-recording information, tag information indicating that photographic data in a predetermined period including the time of the detection of the occurrence of the predetermined event is photographic data showing a dangerous situation (step S21).

Although, in the first embodiment, the danger determining unit 122 performs a first determination process for determining whether or not the event detection location exists on an extracted traveling route of the vehicle 4, a second determination process for deciding whether or not the event detection location exists on a registered registration route, a third determination process for determining whether or not the event detection location exists on the driver's extracted movement route, and a fourth determination process for determining whether or not the event detection location exists within a predetermined range from the dwelling place of a related person of the driver, the present disclosure is not particularly limited thereto, and the danger determining unit 122 may perform any of the first determination process, the second determination process, the third determination process, and the fourth determination process. Also, the danger determining unit 122 may perform at least two of the first determination process, the second determination process, the third determination process, and the fourth determination process.

<Processing in Photographic Apparatus 2>

Figure 8:
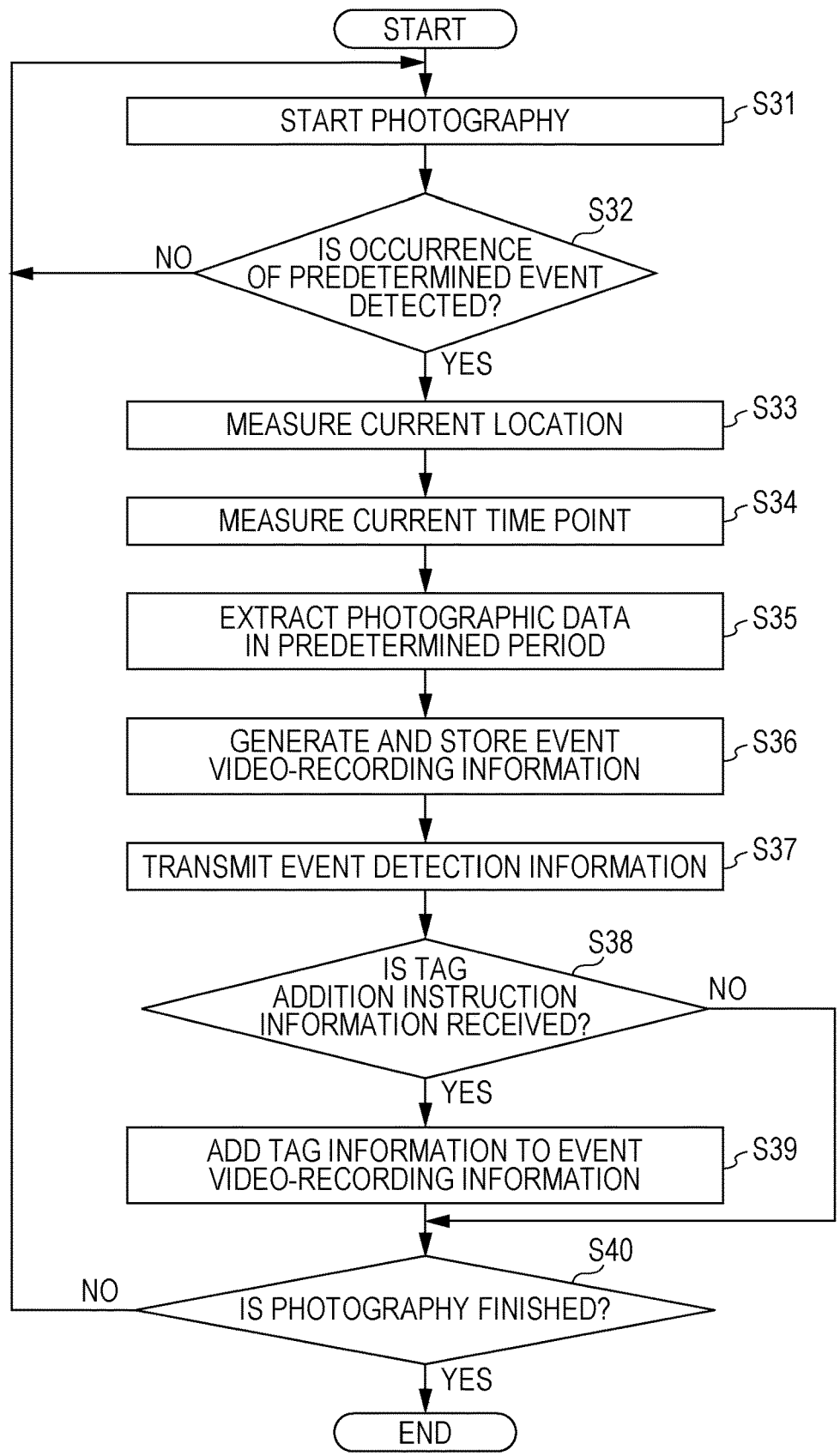
FIG. 8 is a flowchart for describing processing in the photographic apparatus in the first embodiment.

Next, processing in which the photographic apparatus 2 transmits, to the management apparatus 1, event detection information including event detection location information indicating an event detection location of the vehicle 4 at the time of detection of occurrence of a predetermined event and also adds, to event video-recording information, tag information indicating that photographic data in a predetermined period including the time of the detection of the occurrence of the predetermined event is photographic data showing a dangerous situation will be described in detail by using the flowchart in FIG. 8.

FIG. 8 is a flowchart for describing the processing in the photographic apparatus in the first embodiment.

First, upon being triggered by turning on of the engine of the vehicle, the photographing unit 22 in the photographic apparatus 2 starts photography (step S31). The trigger of starting the photography in the photographing unit 22 is not limited to this configuration. For example, the photographing unit 22 may start the photography in response to an input operation by the driver. The photographing unit 22 stores photographic data resulting from periodic photography (e.g., once every 30 milliseconds) in the photography information storage unit 273.

Next, the event detecting unit 25 determines whether or not occurrence of a predetermined event is detected during the photography using the photographing unit 22 (step S32).

When the event detecting unit 25 determines that occurrence of a predetermined event is not detected in step S32 (NO in step S32), the process returns to step S31, and the photographing unit 22 continues the photography.

On the other hand, when the event detecting unit 25 determines that occurrence of a predetermined event is detected in step S32 (YES in step S32), the location measurement unit 23 measures the current location of the photographic apparatus 2 (step S33).

Next, the time measurement unit 24 measures the current time point (step S34).

Next, the event video-recording information recording control unit 261 extracts, from the photography information storage unit 273, photographic data in a predetermined period before and after the time of the detection of the occurrence of the event (step S35).

Next, the event video-recording information recording control unit 261 generates event video-recording information including the extracted photographic data in the predetermined period, event detection location information indicating the location at the time of the detection of the occurrence of the event, the location being measured in step S33, and event detection time-point information indicating the current time point measured in step S34 and stores the generated event video-recording information in the event video-recording information storage unit 274 (step S36).

Next, the event detection information transmission control unit 262 transmits, to the management apparatus 1 via the communication unit 21, event detection information including the event detection location information indicating the location of the vehicle 4 at the time of the detection of the occurrence of the event, the location being measured in step S33 (step S37).

The timing at which the event detection information transmission control unit 262 transmits the event detection information to the management apparatus 1 may be any timing. For example, the event detection information transmission control unit 262 may transmit the event detection information to the management apparatus 1 at a timing at which the event video-recording information is recorded to the event video-recording information storage unit 274. In this case, the event detection information transmission control unit 262 can transmit the event detection information to the management apparatus 1 at a timing close to real time to make it possible to determine whether or not the event video-recording information includes photographic data showing a dangerous situation.

Also, another example of the timing at which the event detection information is transmitted to the management apparatus 1 may be a timing at which the number of pieces of event video-recording information exceeds a predetermined number, a timing at which the driver's transmission instruction input is received, or a timing at which a transmission request from the management apparatus 1 is received.

Next, the tag addition instruction information reception control unit 263 determines whether or not tag addition instruction information transmitted by the management apparatus 1 is received (step S38). In this case, when it is determined that the tag addition instruction information is not received (NO in step S38), the process proceeds to a process in steps S40.

On the other hand, when it is determined that the tag addition instruction information is received (YES in step S38), the tag addition unit 264 adds, to the event video-recording information, tag information indicating that the photographic data shows a dangerous situation. As a result, the event video-recording information includes the photographic data in the predetermined period, the event detection location information, the event detection time-point information, and the tag information. Thus, for example, an administrator who checks the contents of the event video-recording information and extracts event video-recording information including photographic data showing a dangerous situation can extract only event video-recording information including photographic data showing a dangerous situation or photographic data showing a situation that is highly likely to be dangerous, by checking the tag information. Thus, it is possible to enhance the efficiency of work.

Although, in the first embodiment, the photographic apparatus 2 transmits the event detection information to the management apparatus 1, the present disclosure is not particularly limited thereto, and the photographic apparatus 2 may transmit the event video-recording information including the photographic data in the predetermined period, the event detection location information, and the event detection time-point information to the management apparatus 1. In this case, the management apparatus 1 obtains the event video-recording information, stores the event video-recording information in the storage unit 13, and extracts the event detection location information from the event video-recording information. The management apparatus 1 then performs the processes in steps S13 to S20 in FIGS. 5 and 6. When it is determined that the event detection location exists on the traveling route of the vehicle 4 (YES in step S14), when it is determined that the event detection location exists on the registration route (YES in step S16), when it is determined that the event detection location exists on the driver's movement route (YES in step S18), or when it is determined that the event detection location is within the predetermined range from the dwelling place of the related person of the driver (YES in step S20), the tag-addition control unit 123 adds, to the event video-recording information, tag information indicating that the photographic data in the predetermined period including the time of the detection of the occurrence of the predetermined event is photographic data showing a dangerous situation.

Also, although, in the first embodiment, the processing is ended when it is determined in step S20 in FIG. 6 that the event detection location does not exist within the predetermined range from the dwelling place of the related person of the driver, the present disclosure is not particularly limited thereto. When it is determined that the event detection location does not exist within the predetermined range from the dwelling place of the related person of the driver, the tag-addition control unit 123 may transmit, to the photographic apparatus 2, tag addition instruction information giving an instruction for adding, to the event video-recording information, tag information indicating that the photographic data in the predetermined period including the time of the detection of the occurrence of the predetermined event is not photographic data showing a dangerous situation. That is, classifying and recording photographic images may include adding, to the corresponding photographic images, a tag indicating that the location indicated by the event detection location information is not a location where the driver is estimated to have visited a plurality of times, and recording the resulting photographic images, when the location indicated by the event detection location information is not determined to be a location where the driver is estimated to have visited a plurality of times.

Also, when it is determined that the event detection location does not exist within the predetermined range from the dwelling place of the related person of the driver, the management apparatus 1 may transmit, to the photographic apparatus 2, information indicating that the photographic data in the predetermined period including the time of the detection of the occurrence of the predetermined event is not photographic data showing a dangerous situation, and the photographic apparatus 2 that receives the information may delete the corresponding event video-recording information.

Second Embodiment

In the first embodiment, the danger determining unit 122 performs the first determination process for determining whether or not the event detection location exists on an extracted traveling route of the vehicle 4, the second determination process for deciding whether or not the event detection location exists on a registered registration route, the third determination process for determining whether or not the event detection location exists on an extracted driver's movement route, and the fourth determination process for determining whether or not the event detection location exists within a predetermined range from the dwelling place of a related person of the driver. In contrast, in a second embodiment, in accordance with at least one determination result of the first determination process, the second determination process, the third determination process, and the fourth determination process, photographic images are classified and stored for each determination process that was performed.

That is, in the first determination process, whether or not the event detection location is a location where the driver is estimated to have visited a plurality of times can be made with the highest accuracy; in the second determination process, whether or not the event detection location is a location where the driver is estimated to have visited a plurality of times can be made with the second highest accuracy; in the third determination process, whether or not the event detection location is a location where the driver is estimated to have visited a plurality of times can be made with the third highest accuracy; and in the fourth determination process, whether or not the event detection location is a location where the driver is estimated to have visited a plurality of times can be made with the fourth highest accuracy.

Thus, by checking in which determination process of the first determination process, the second determination process, the third determination process, and the fourth determination process an affirmative result was obtained, the administrator can efficiently extract a photographic image showing a dangerous situation. That is, a photographic image for which an affirmative result was obtained in the first determination process is highly likely to be a photographic image showing a dangerous situation, and by preferentially checking a photographic image for which an affirmative result was obtained in the first determination process, the administrator can improve the work efficiency for extracting a photographic image showing a dangerous situation.

Figure 9:
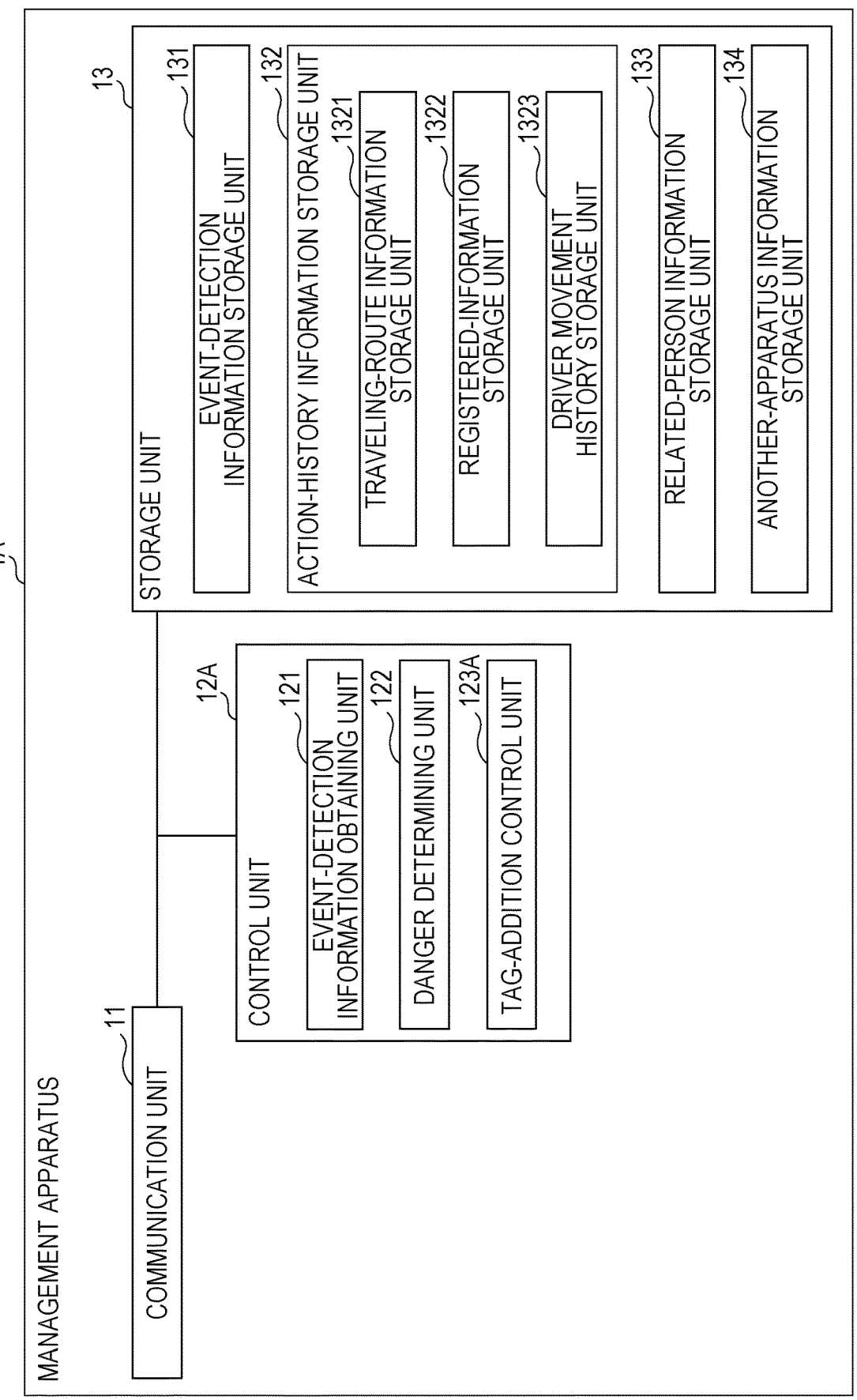
FIG. 9 is a block diagram illustrating the configuration of a management apparatus in a second embodiment.

FIG. 9 is a block diagram illustrating the configuration of a management apparatus in the second embodiment. In a management apparatus 1A in the second embodiment, elements that are the same as those in the management apparatus 1 in the first embodiment are denoted by the same reference numerals, and descriptions thereof are omitted.

The management apparatus 1A includes a communication unit 11, a control unit 12A, and a storage unit 13. The control unit 12A is, for example, a CPU and includes an event-detection information obtaining unit 121, a danger determining unit 122, and a tag-addition control unit 123A.

The tag-addition control unit 123A identifies, of the first determination process, the second determination process, the third determination process, and the fourth determination process, the determination process in which the determination was affirmatively made and classifies and records photographic images for each determination process.

When it is determined that the event detection location indicated by the event detection location information is a location where the driver is estimated to have visited a plurality of times, the tag-addition control unit 123A transmits, to a photographic apparatus 2A via the communication unit 11, tag addition instruction information giving an instruction for adding, to the event video-recording information, tag information indicating that photographic data in a predetermined period including the time of the detection of the occurrence of the predetermined event is photographic data showing a dangerous situation. In this case, the tag-addition control unit 123A identifies the determination process in which the determination was affirmatively made among the first determination process for determining whether or not the event detection location exists on an extracted traveling route of the vehicle 4, the second determination process for deciding whether or not the event detection location exists on a registered registration route, the third determination process for determining whether or not the event detection location exists on an extracted driver's movement route, and the fourth determination process for determining whether or not the event detection location exists within a predetermined range from the dwelling place of the related person of the driver, and generates tag addition instruction information including determination-process identification information for identifying the identified determination process.

Figure 10:
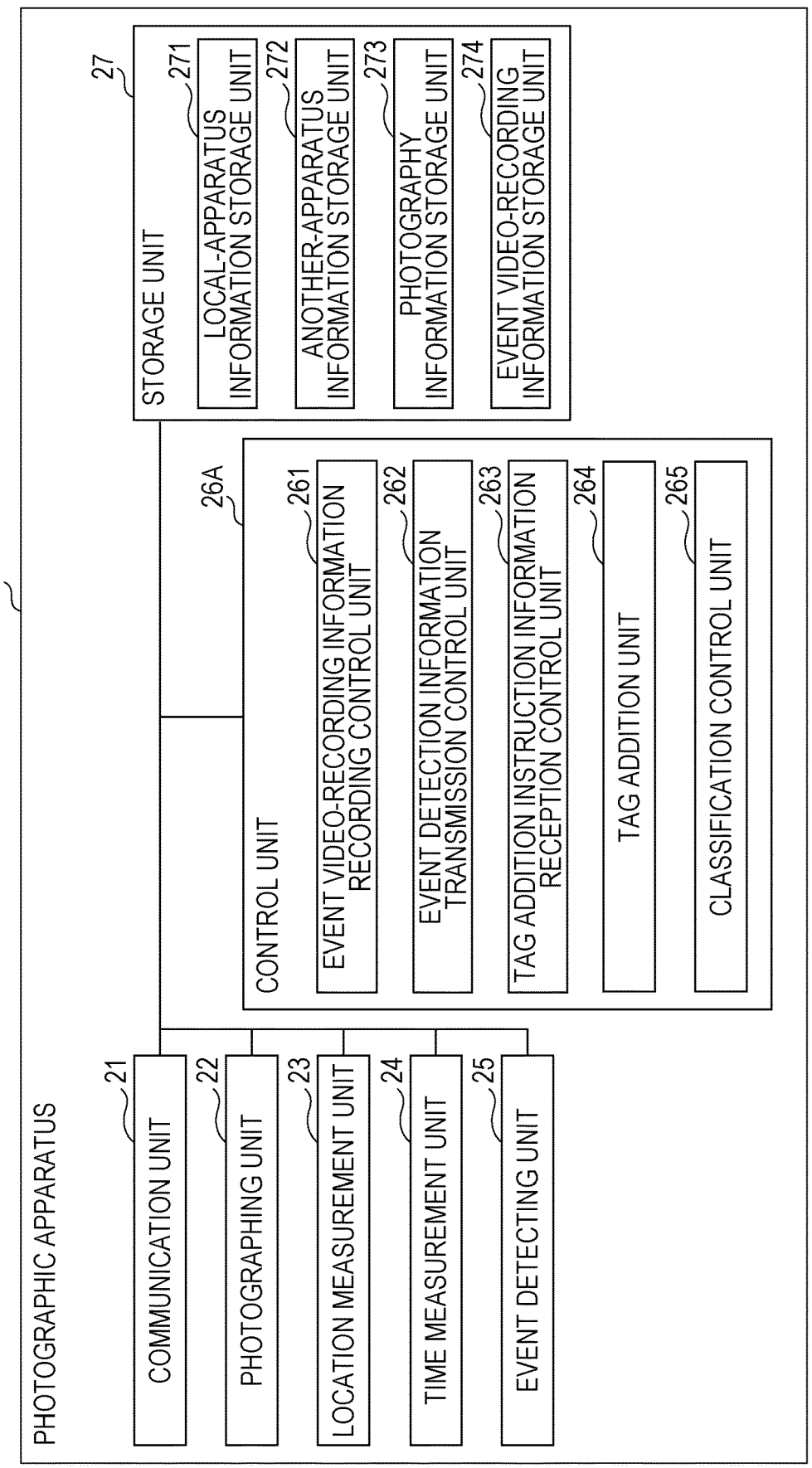
FIG. 10 is a block diagram illustrating the configuration of a photographic apparatus in the second embodiment.

FIG. 10 is a block diagram illustrating the configuration of the photographic apparatus in the second embodiment.

The photographic apparatus 2A includes a communication unit 21, a photographing unit 22, a location measurement unit 23, a time measurement unit 24, an event detecting unit 25, a control unit 26A, and a storage unit 27. The control unit 26A is, for example, a CPU and includes an event video-recording information recording control unit 261, an event detection information transmission control unit 262, a tag addition instruction information reception control unit 263, a tag addition unit 264, and a classification control unit 265.

The classification control unit 265 refers to the determination-process identification information included in the tag addition instruction information received by the tag addition instruction information reception control unit 263 to classify event video-recording information for each determination process of the first determination process, the second determination process, the third determination process, and the fourth determination process. That is, the classification control unit 265 classifies event video-recording information into a first group when the determination was affirmatively made in the first determination process, classifies event video-recording information into a second group when the determination was affirmatively made in the second determination process, classifies event video-recording information into a third group when the determination was affirmatively made in the third determination process, classifies event video-recording information into a fourth group when the determination was affirmatively made in the fourth determination process, and stores the classified event video-recording information in the event video-recording information storage unit 274.

Processing in the management apparatus 1A in the second embodiment is substantially the same as the processing in the management apparatus 1 in the first embodiment illustrated in FIGS. 5 and 6, and only the process in steps S21 differs.

That is, in the second embodiment, when it is determined that the event detection location exists on the traveling route of the vehicle 4 (YES in step S14), in step S21, the tag-addition control unit 123 transmits, to the photographic apparatus 2A via the communication unit 11, tag addition instruction information including determination-process identification information for identifying that the determination process in which the determination was affirmatively made is the first determination process.

Also, when it is determined that the event detection location exists on the registration route (YES in step S16), in step S21, the tag-addition control unit 123 transmits, to the photographic apparatus 2A via the communication unit 11, tag addition instruction information including determination-process identification information for identifying that the determination process in which the determination was affirmatively made is the second determination process.

Also, when it is determined that the event detection location exists on the driver's movement route (YES in step S18), in step S21, the tag-addition control unit 123 transmits, to the photographic apparatus 2A via the communication unit 11, tag addition instruction information including determination-process identification information for identifying that the determination process in which the determination was affirmatively made is the third determination process.

In addition, when it is determined that the event detection location exists within a predetermined range from the dwelling place of the related person of the driver (YES in step S20), in step S21, the tag-addition control unit 123 transmits, to the photographic apparatus 2A via the communication unit 11, tag addition instruction information including determination-process identification information for identifying that the determination process in which the determination was affirmatively made is the fourth determination process.

Figure 11:
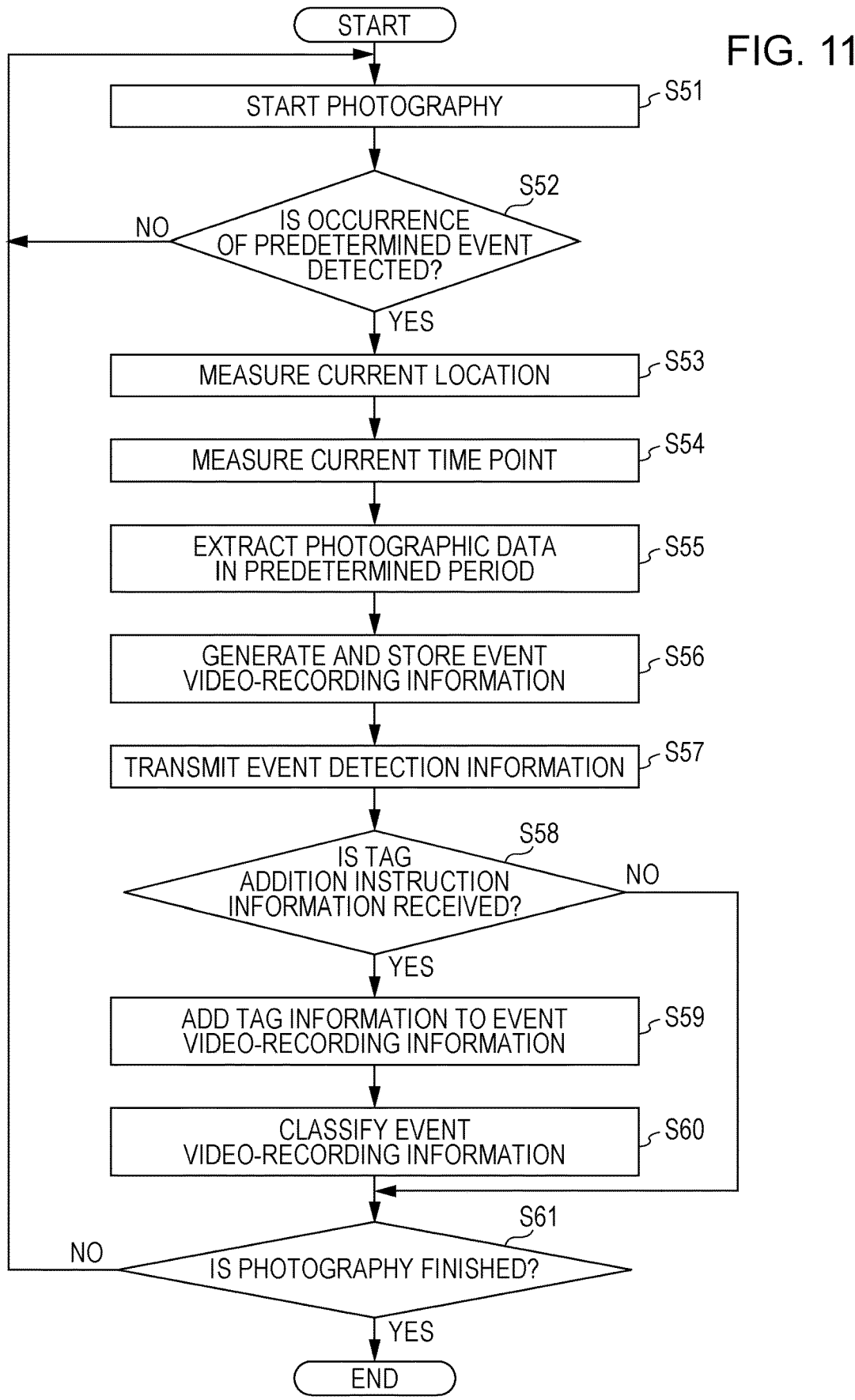
FIG. 11 is a flowchart for describing processing in the photographic apparatus in the second embodiment.

FIG. 11 is a flowchart for describing processing in the photographic apparatus in the second embodiment.

Since processes in steps S51 to S59 illustrated in FIG. 11 are the same as the processes in steps S31 and S39 in FIG. 8, descriptions thereof are omitted.

Next, the classification control unit 265 refers to the determination-process identification information included in the tag addition instruction information received by the tag addition instruction information reception control unit 263 to classify the event video-recording information for each determination process of the first determination process, the second determination process, the third determination process, and the fourth determination process (step S60). That is, the classification control unit 265 classifies the event video-recording information into a first group when the determination was affirmatively made in the first determination process, classifies the event video-recording information into a second group when the determination was affirmatively made in the second determination process, classifies the event video-recording information into a third group when the determination was affirmatively made in the third determination process, classifies the event video-recording information into a fourth group when the determination was affirmatively made in the fourth determination process, and stores the classified event video-recording information in the event video-recording information storage unit 274.

Since a process in steps S61 illustrated in FIG. 11 is the same as the process in steps S40 illustrated in FIG. 8, a description thereof is omitted.

Figure 12:
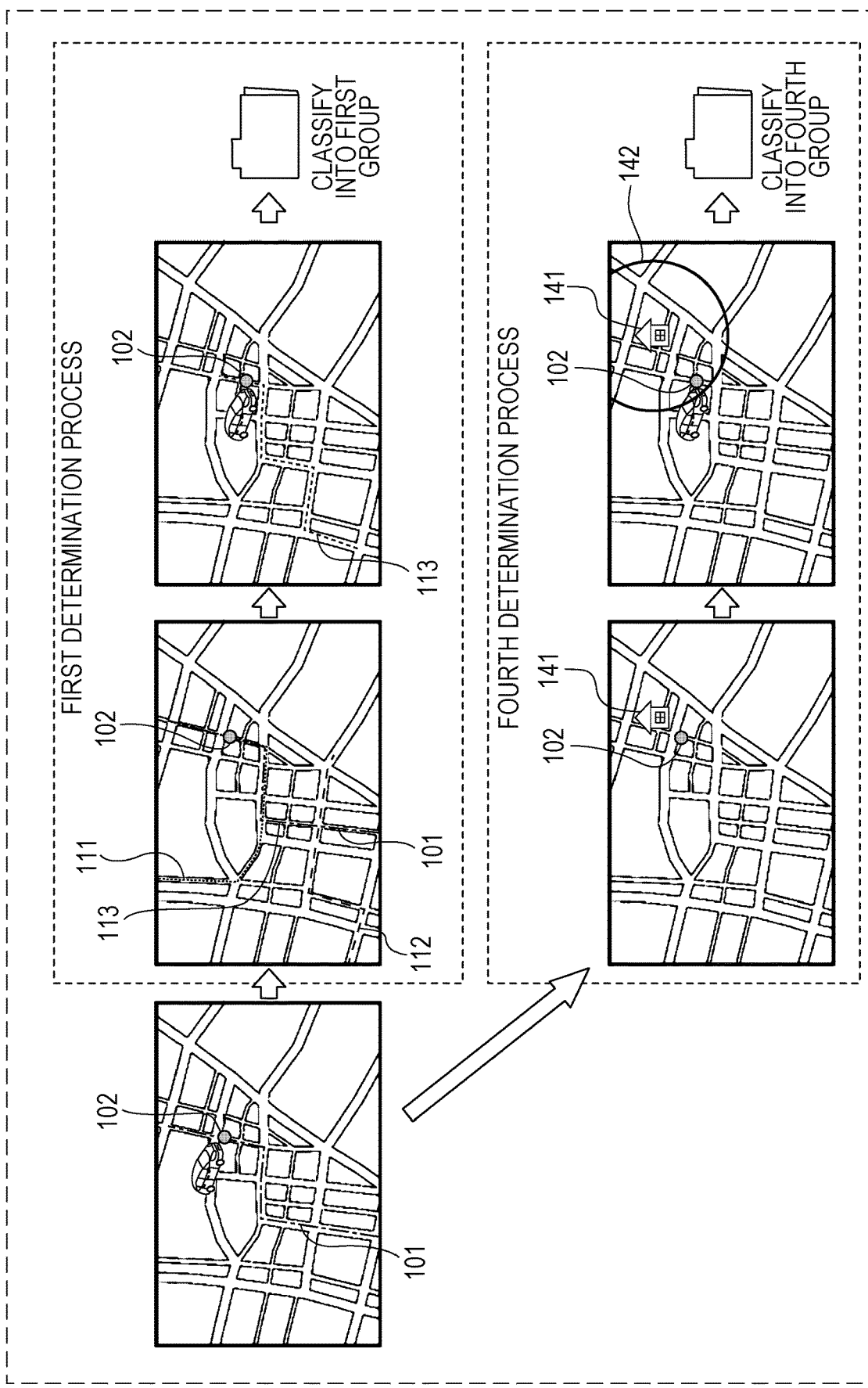
FIG. 12 is a schematic diagram for describing, in the second embodiment, processing for classifying event video-recording information into a first group or a fourth group.

FIG. 12 is a schematic diagram for describing, in the second embodiment, processing for classifying the event video-recording information into the first group or the fourth group.

In FIG. 12, when a predetermined event occurs while the vehicle 4 is traveling on a traveling route 101, the event-detection information obtaining unit 121 obtains event detection information including event detection location information indicating an event detection location 102 of the vehicle 4 at the time of detection of the occurrence of the predetermined event that triggers recording of photographic images acquired by photography using the photographic apparatus 2A installed on the vehicle 4.

Subsequently, the danger determining unit 122 extracts, from past traveling routes 111, 112, and 113 in the traveling-route information storage unit 1321, the traveling route 113 of the vehicle 4 along which the number of travels is larger than or equal to a predetermined number of times. In FIG. 12, the traveling route 113 is extracted as a traveling route along which the number of travels is larger than or equal to the predetermined number of times.

Then, the danger determining unit 122 performs the first determination process for determining whether or not the event detection location 102 exists on the extracted the traveling route 113 of the vehicle 4. In FIG. 12, the danger determining unit 122 determines that the event detection location 102 exists on the extracted the traveling route 113 of the vehicle 4. In this case, the tag-addition control unit 123 transmits, to the photographic apparatus 2A via the communication unit 11, tag addition instruction information including determination-process identification information for identifying that the determination process in which the determination was affirmatively made is the first determination process. The classification control unit 265 in the photographic apparatus 2A refers to the determination-process identification information included in the tag addition instruction information reception control unit 263 to classify the event video-recording information into the first group and stores the event video-recording information in the event video-recording information storage unit 274.

On the other hand, when negative determination results are obtained in the first determination process, the second determination process, and the third determination process, the danger determining unit 122 extracts, from the related-person information storage unit 133, a dwelling place 141 pre-registered as a place where the related person of the driver lives. The danger determining unit 122 then performs the fourth determination process for determining whether or not the event detection location 102 exists within a predetermined range 142 from the dwelling place 141 of the related person of the driver. In FIG. 12, the danger determining unit 122 determines that the event detection location 102 exists within the predetermined range 142 from the dwelling place 141 of the related person of the driver. In this case, the tag-addition control unit 123 transmits, to the photographic apparatus 2A via the communication unit 11, tag addition instruction information including determination-process identification information for identifying that the determination process in which the determination was affirmatively made is the fourth determination process. The classification control unit 265 in the photographic apparatus 2A refers to the determination-process identification information included in the tag addition instruction information received by the tag addition instruction information reception control unit 263 to classify the event video-recording information into the fourth group and stores the classified event video-recording information in the event video-recording information storage unit 274.

In the second embodiment, a first determination process for determining, based on movement history of a moving body, whether or not the event detection location indicated by event detection location information is a location through which the moving body has passed a plurality of times in the past; a second determination process for determining whether or not the event detection location indicated by the event detection location information is a location that exists on a route pre-registered in the moving body or whether or not the event detection location indicated by the event detection location information is a location that exists within a predetermined range from a destination pre-registered in the moving body; a third determination process for determining, based on the movement history of the driver, whether or not the event detection location indicated by the event detection location information is a location through which the driver has passed a plurality of times in the past; and a fourth determination process for determining whether or not the event detection location indicated by the event detection location information is a location that exists within a predetermined range from a dwelling place pre-registered as a place where a related person lives. However, the present disclosure is not particularly limited thereto, and a fifth determination process for determining whether or not the event detection location indicated by the event detection location information is a location that exists within a predetermined range from an execution place pre-registered as a place where the driver executed a specific action may be performed. In this case, the danger determining unit 122 performs at least one of the first determination process, the second determination process, the third determination process, the fourth determination process, and the fifth determination process. Then, the tag-addition control unit 123A may identify the determination process in which the determination was affirmatively made among the first determination process, the second determination process, the third determination process, the fourth determination process, and the fifth determination process and may classify and record photographic images for each determination process.

Also, the classification of the photographic images in the second embodiment may be realized by the tag addition in the first embodiment. For example, classification information corresponding to each determination process may be added to a tag, and a photographic image may be distinguished by referring to the classification information added to the tag.

Third Embodiment

In the first embodiment, the danger determining unit 122 determines whether or not the event detection location is a location through which the vehicle 4 has passed a plurality of times in the past. In contrast, in a third embodiment, a management apparatus obtains time information indicating a time point at which occurrence of a predetermined event was detected, and when it is determined that the event detection location is a location through which the vehicle 4 has passed a plurality of times in the past, the management apparatus determines whether or not the time point indicated by the time information is included in a passage time segment determined by a movement time point at which the vehicle 4 passed through the event detection location in the past.

That is, when the event detection location is a location along which the vehicle 4 has passed a plurality of times in the past, and the time point at which the occurrence of the event was detected is included in a passage time segment determined by a movement time point at which the vehicle 4 passed through the event detection location in the past, the event that occurred is highly likely to be due to a dangerous situation. Thus, it is possible to further increase the accuracy of extracting a photographic image showing a dangerous situation.

Figure 13:
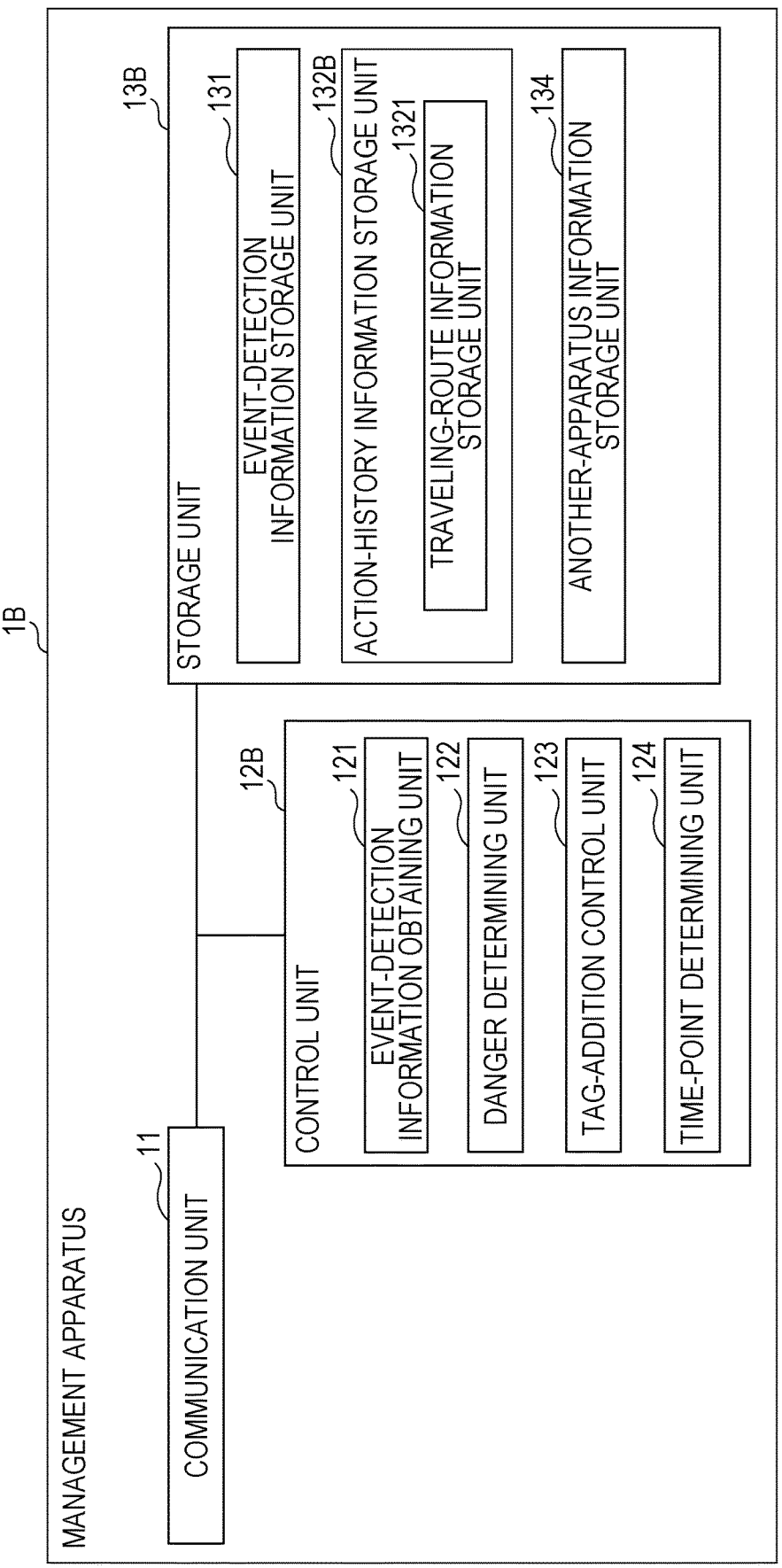
FIG. 13 is a block diagram illustrating the configuration of a management apparatus in a third embodiment.

FIG. 13 is a block diagram illustrating the configuration of the management apparatus in the third embodiment. In a management apparatus 1B in the third embodiment, elements that are the same as those in the management apparatus 1 in the first embodiment are denoted by the same reference numerals, and descriptions thereof are omitted.

The management apparatus 1B includes a communication unit 11, a control unit 12B, and a storage unit 13B. The control unit 12B is, for example, a CPU and includes an event-detection information obtaining unit 121, a danger determining unit 122, a tag-addition control unit 123, and a time-point determining unit 124.

The storage unit 13B includes an event-detection information storage unit 131, an action-history information storage unit 132B, and an another-apparatus information storage unit 134. The action-history information storage unit 132B includes a traveling-route information storage unit 1321.

The event-detection information obtaining unit 121 obtains, via the communication unit 11, event detection information transmitted by a photographic apparatus 2B. The event detection information in the third embodiment includes event detection location information indicating the location of the vehicle 4 at the time of occurrence of a predetermined event that triggers recording of photographic images acquired by photography using the photographic apparatus 2B installed on the vehicle 4, event detection time-point information indicating a time point at the time of detection of the occurrence of the predetermined event, and event identification information for identifying the predetermined event.

When the danger determining unit 122 determines that event detection location indicated by the event detection location information is a location through which the vehicle 4 has passed a plurality of times in the past, the time-point determining unit 124 determines whether or not the event detection time point indicated by the event detection time-point information is included in the passage time segment determined by a movement time point at which the vehicle 4 passed through the event detection location in the past. Past movement time points of the vehicle 4, for example, the passage time points of predetermined locations on past traveling routes, are stored in the traveling-route information storage unit 1321.

The time-point determining unit 124 may, for example, calculate an average time point at which a traveling route that passes through the event detection location and along which the number of travels is equal to or larger than a predetermined number of times passes through the event detection location and may calculate, as the passage time segment, a period obtained by adding a predetermined time to a period before and after the average time point. For example, when the average time point at which the event detection location is passed through is 8:00 a.m., the time-point determining unit 124 may determine, as the passage time segment, a period from 7:30 a.m. to 8:30 a.m. obtained by adding 30 minutes to a period before and after 8:00 a.m., which is the average time point. The passage time segment is not limited to the above-described time segment and may be a time segment with which a determination can be made as to whether or not the vehicle 4 passed through the event detection location in the past at generally the same time point as the event detection time point.

When it is determined that the event detection time point is included in the passage time segment determined by the movement time point at which the vehicle 4 passed through the event detection location in the past, the tag-addition control unit 123 transmits, to the photographic apparatus 2B via the communication unit 11, tag addition instruction information giving an instruction for adding, to the event video-recording information, tag information indicating that photographic data in a predetermined period including the time of the detection of the occurrence of the predetermined event is photographic data showing a dangerous situation.

Figure 14:
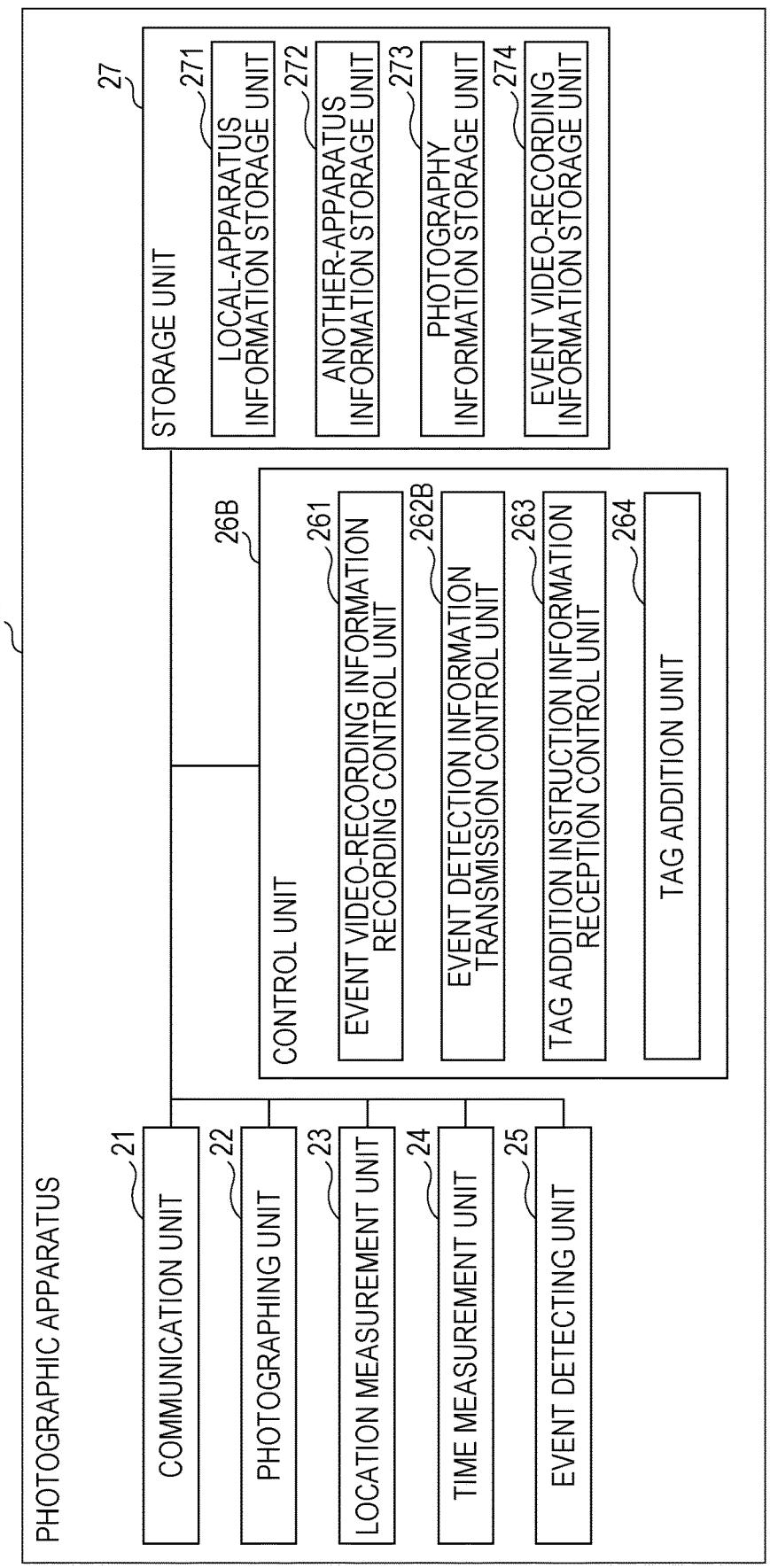
FIG. 14 is a block diagram illustrating the configuration of a photographic apparatus in the third embodiment.

FIG. 14 is a block diagram illustrating the configuration of the photographic apparatus in the third embodiment. In the photographic apparatus 2B in the third embodiment, elements that are the same as those in the photographic apparatus 2 in the first embodiment are denoted by the same reference numerals, and descriptions thereof are omitted.

The photographic apparatus 2B includes a communication unit 21, a photographing unit 22, a location measurement unit 23, a time measurement unit 24, an event detecting unit 25, a control unit 26B, and a storage unit 27. The control unit 26B is, for example, a CPU and includes an event video-recording information recording control unit 261, an event detection information transmission control unit 262B, a tag addition instruction information reception control unit 263, and a tag addition unit 264.

The event detection information transmission control unit 262B transmits, to the management apparatus 1B via the communication unit 21, event detection information including at least the location information indicating the location of the vehicle 4 at the time when the event detecting unit 25 detected occurrence of a predetermined event and time-point information indicating the time point at which the occurrence of the predetermined event was detected. When the event detecting unit 25 detects occurrence of a predetermined event, the event detection information transmission control unit 262B obtains location information of the photographic apparatus 2B from the location measurement unit 23 and also obtains the current time point from the time measurement unit 24. Then, the event detection information transmission control unit 262B generates event detection information including the obtained location information as event detection location information and also including the obtained time point as event detection time-point information and transmits the generated event detection information to the management apparatus 1B.

Figure 15:
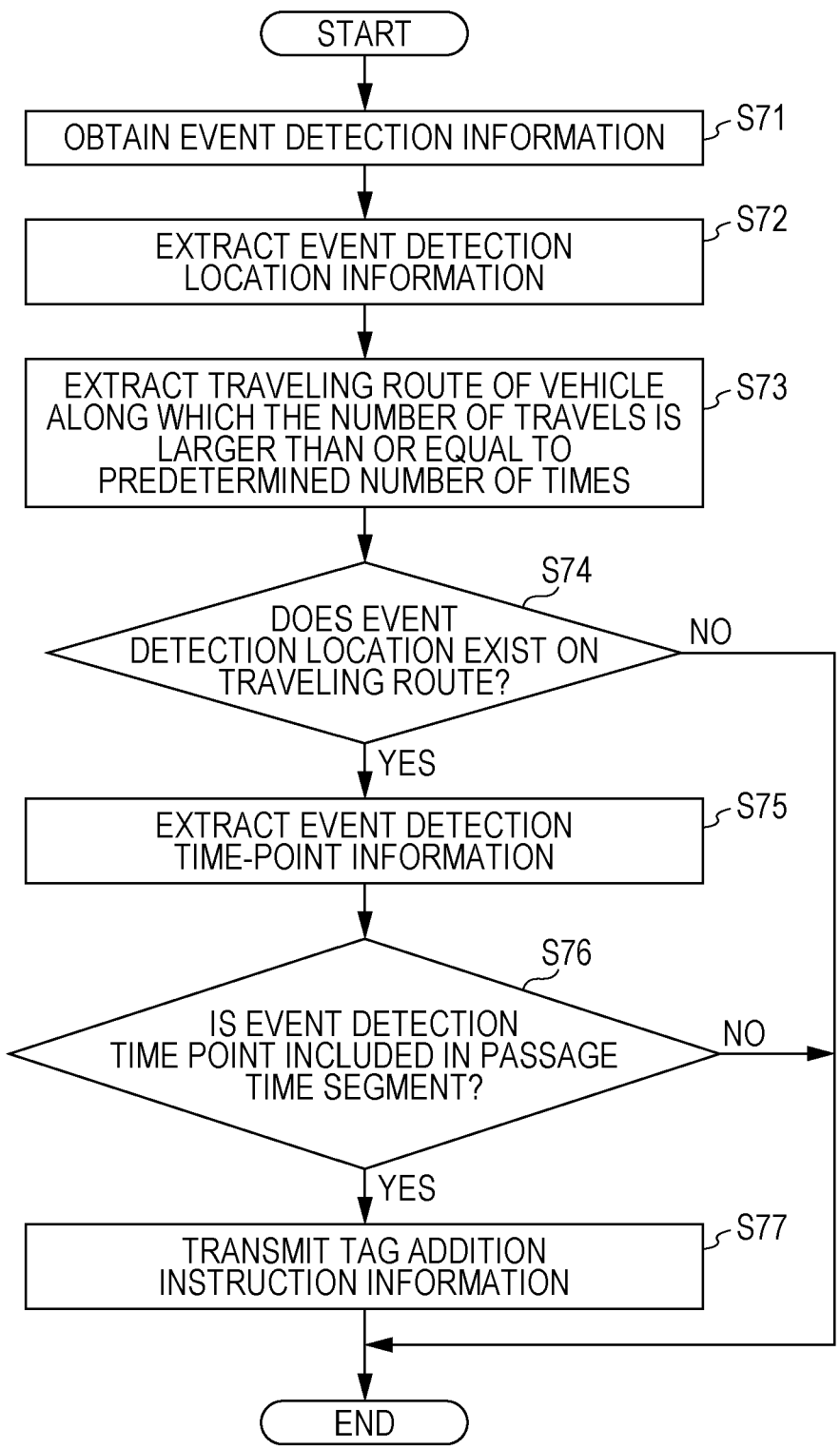
FIG. 15 is a flowchart for describing processing in the management apparatus in the third embodiment.

FIG. 15 is a flowchart for describing processing in the management apparatus in the third embodiment.

Since processes in steps S71 to S74 illustrated in FIG. 15 are the same as the processes in steps S11 to S14 illustrated in FIG. 5, descriptions thereof are omitted.

When it is determined in step S74 that the event detection location does not exist on the traveling route of the vehicle 4 (NO in step S74), the processing ends.

On the other hand, when it is determined in step S74 that the event detection location exists on the traveling route of the vehicle 4 (YES in step S74), the time-point determining unit 124 extracts the event detection time-point information from the event detection information obtained by the event-detection information obtaining unit 121 (step S75).

Next, the time-point determining unit 124 determines whether or not the event detection time point indicated by the event detection time-point information is included in a passage time segment determined by a movement time point at which the vehicle 4 passed through the event detection location in the past. In this case, when it is determined that the event detection time point is not included in the passage time segment (NO in step S76), the processing ends.

On the other hand, when it is determined that the event detection time point is included in the passage time segment (YES in step S76), the tag-addition control unit 123 transmits, to the photographic apparatus 2B via the communication unit 11, tag addition instruction information giving an instruction for adding, to the event video-recording information, tag information indicating that photographic data in a predetermined period including the time of the detection of the occurrence of the predetermined event is photographic data showing a dangerous situation (step S77).

The processing in the photographic apparatus 2B is substantially the same as the processing in the photographic apparatus 2 in the first embodiment illustrated in FIG. 8, and only the process in step S37 in FIG. 8 differs. In the third embodiment, in step S37 in FIG. 8, the event detection information transmission control unit 262B transmits, to the management apparatus 1B via the communication unit 21, event detection information including event detection location information indicating a location at a time when the occurrence of the event was detected, the location being measured in step S33, and event detection time-point information indicating the time point at which the occurrence of the event was detected, the time being measured in step S34.

Fourth Embodiment

In the first embodiment, the danger determining unit 122 determines whether or not the event detection location is a location through which the vehicle 4 has passed a plurality of times in the past. In contrast, in a fourth embodiment, a management apparatus obtains environment information indicating an external environment of the vehicle 4 at the time of detection of occurrence of a predetermined event, and when it is determined that the event detection location is a location through which the vehicle 4 has passed a plurality of times in the past, the management apparatus determines whether or not the external environment indicated by the environment information matches an external environment when the vehicle 4 passed through the event detection location in the past.

That is, when the event detection location is a location through which the vehicle 4 has passed a plurality of times in the past, and the external environment of the vehicle 4 at the time of the detection of the occurrence of the event matches the external environment when the vehicle 4 passed through the event detection location in the past, the event that occurred is highly likely to be due to a dangerous situation. Thus, it is possible to further increase the accuracy of extracting a photographic image showing a dangerous situation.

Figure 16:
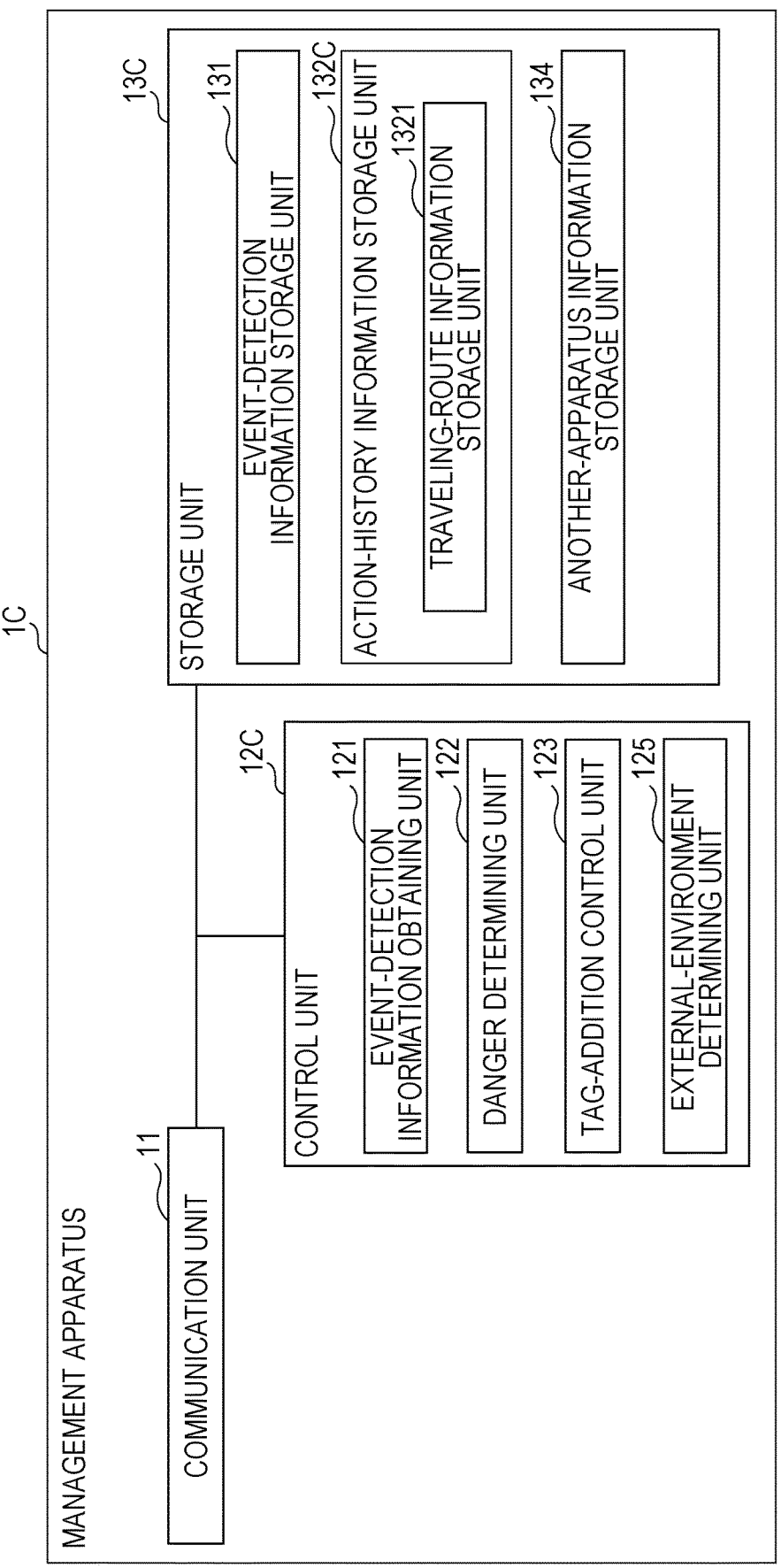
FIG. 16 is a block diagram illustrating the configuration of a management apparatus in a fourth embodiment.

FIG. 16 is a block diagram illustrating the configuration of the management apparatus in the fourth embodiment. In a management apparatus 1C in the fourth embodiment, elements that are the same as those in the management apparatus 1 in the first embodiment are denoted by the same reference numerals, and descriptions thereof are omitted.

The management apparatus 1C includes a communication unit 11, a control unit 12C, and a storage unit 13C. The control unit 12C is, for example, a CPU and includes an event-detection information obtaining unit 121, a danger determining unit 122, a tag-addition control unit 123, and an external-environment determining unit 125.

The storage unit 13C includes an event-detection information storage unit 131, an action-history information storage unit 132C, and an another-apparatus information storage unit 134. The action-history information storage unit 132C includes a traveling-route information storage unit 1321.

The event-detection information obtaining unit 121 obtains, via the communication unit 11, event detection information transmitted by the photographic apparatus 2B. The event detection information in the third embodiment includes event detection location information indicating the location of the vehicle 4 at the time of detection of occurrence of a predetermined event that triggers recording of photographic images acquired by photography using the photographic apparatus 2B installed on the vehicle 4, event detection environment information indicating the external environment of the vehicle 4 at the time of the detection of the occurrence of the predetermined event, and event identification information for identifying the predetermined event.

The event detection environment information includes at least one of information indicating the weather, information indicating whether or not a road through which the vehicle 4 passes is congested, and information indicating external brightness of the vehicle 4.

When the danger determining unit 122 determines that the event detection location indicated by the event detection location information is a location where the driver is estimated to have visited a plurality of times, the external-environment determining unit 125 determines whether or not the external environment indicated by the event detection environment information matches an external environment when the vehicle 4 passed through the event detection location in the past. Past external environments of the vehicle 4, for example, external environments of predetermined locations on past traveling routes, are stored in the traveling-route information storage unit 1321.

When it is determined that the external environment when the occurrence of the event was detected matches the external environment when the vehicle 4 passed through the event detection location in the past, the tag-addition control unit 123 transmits, to a photographic apparatus 2C via the communication unit 11, tag addition instruction information giving an instruction for adding, to the event video-recording information, tag information indicating that the photographic data in the predetermined period including the time of the detection of the occurrence of the predetermined event is photographic data showing a dangerous situation.

Figure 17:
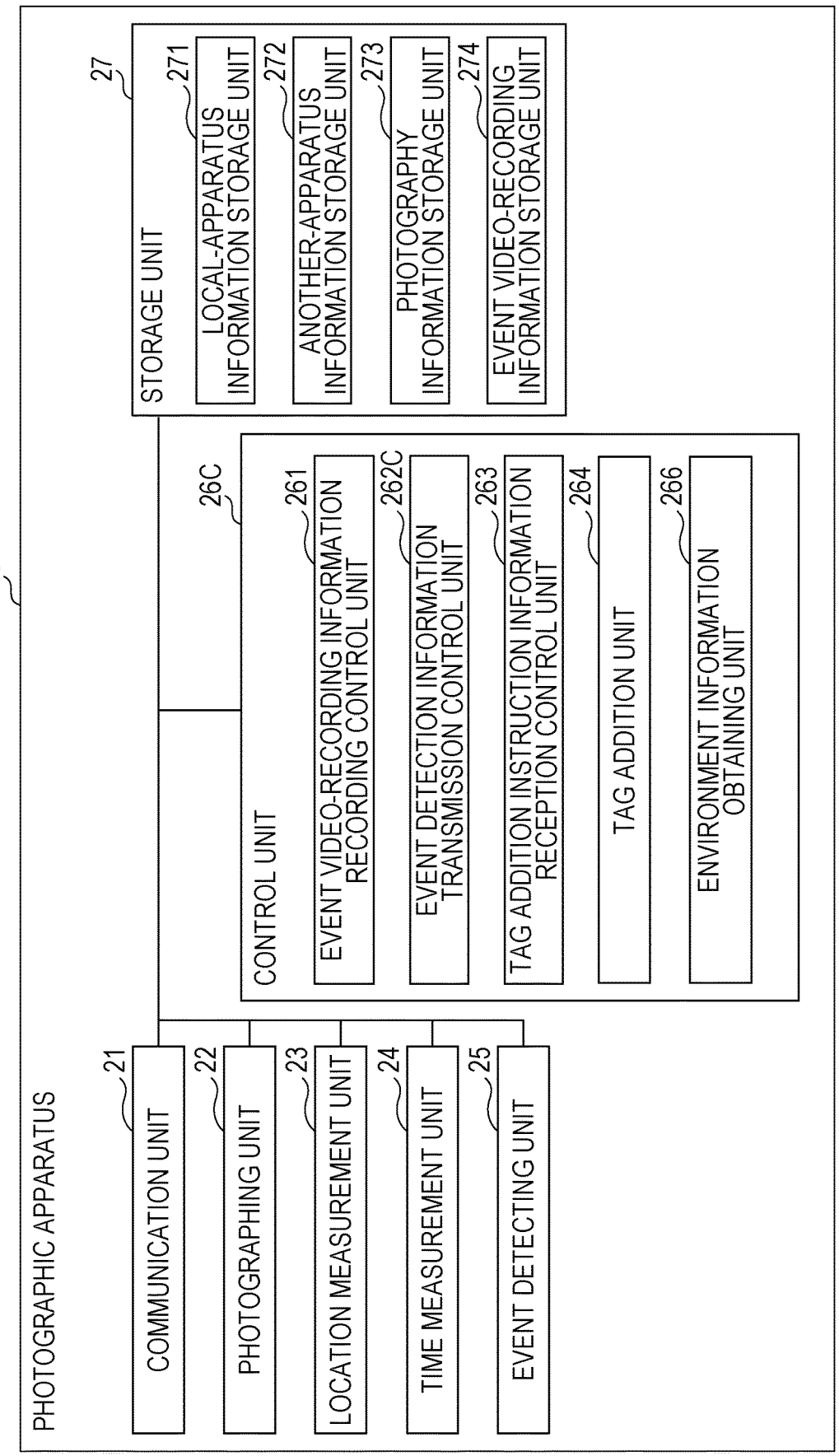
FIG. 17 is a block diagram illustrating the configuration of a photographic apparatus in the fourth embodiment.

FIG. 17 is a block diagram illustrating the configuration of the photographic apparatus in the fourth embodiment. In the photographic apparatus 2C in the fourth embodiment, elements that are the same as those in the photographic apparatus 2 in the first embodiment are denoted by the same reference numerals, and descriptions thereof are omitted.

The photographic apparatus 2C includes a communication unit 21, a photographing unit 22, a location measurement unit 23, a time measurement unit 24, an event detecting unit 25, a control unit 26C, and a storage unit 27. The control unit 26C is, for example, a CPU and includes an event video-recording information recording control unit 261, an event detection information transmission control unit 262C, a tag addition instruction information reception control unit 263, a tag addition unit 264, and an environment information obtaining unit 266.

The environment information obtaining unit 266 obtains event detection environment information indicating an external environment of the vehicle 4 at the time of detection of occurrence of a predetermined event. The event detection environment information includes at least one of information indicating the weather, information indicating whether or not a road through which the vehicle 4 passes is congested, and information indicating external brightness of the vehicle 4.

The environment information obtaining unit 266 decides which of clear, rainy, snowy, and cloudy weathers the external weather of the vehicle 4 is, based on an external photographic image of the vehicle 4 photographed by the photographing unit 22, and generates event detection environment information indicating the weather. The environment information obtaining unit 266 may also obtain information about the weather at the event detection location from an external device via the communication unit 21.

Also, the environment information obtaining unit 266 decides whether or not a road through which the vehicle 4 passes is congested, based on an external photographic image of the vehicle 4 photographed by the photographing unit 22, and generates event detection environment information indicating whether or not the road through which the vehicle 4 passes is congested. The environment information obtaining unit 266 may obtain, from an external device via the communication unit 21, information indicating whether or not a road at the event detection location is congested.

Also, the environment information obtaining unit 266 determines external brightness of the vehicle 4, based on an external photographic image of the vehicle 4 photographed by the photographing unit 22, and generates event detection environment information indicating the external brightness of the vehicle 4. An illuminometer disposed on the vehicle 4 may measure the external brightness of the vehicle 4.

The event detection information transmission control unit 262C transmits, to the management apparatus 1C via the communication unit 21, event detection information including at least the location information indicating the location of the vehicle 4 at a time when the event detecting unit 25 detected occurrence of a predetermined event and event detection environment information indicating the external environment of the vehicle 4 at the time of the detection of the occurrence of the predetermined event. When the event detecting unit 25 detects occurrence of a predetermined event, the event detection information transmission control unit 262C obtains location information of the photographic apparatus 2C from the location measurement unit 23 and also obtains event detection environment information from the environment information obtaining unit 266. Then, the event detection information transmission control unit 262C generates event detection information including the obtained location information as event detection location information and also including the obtained event detection environment information and transmits the generated event detection information to the management apparatus 1C.

Figure 18:
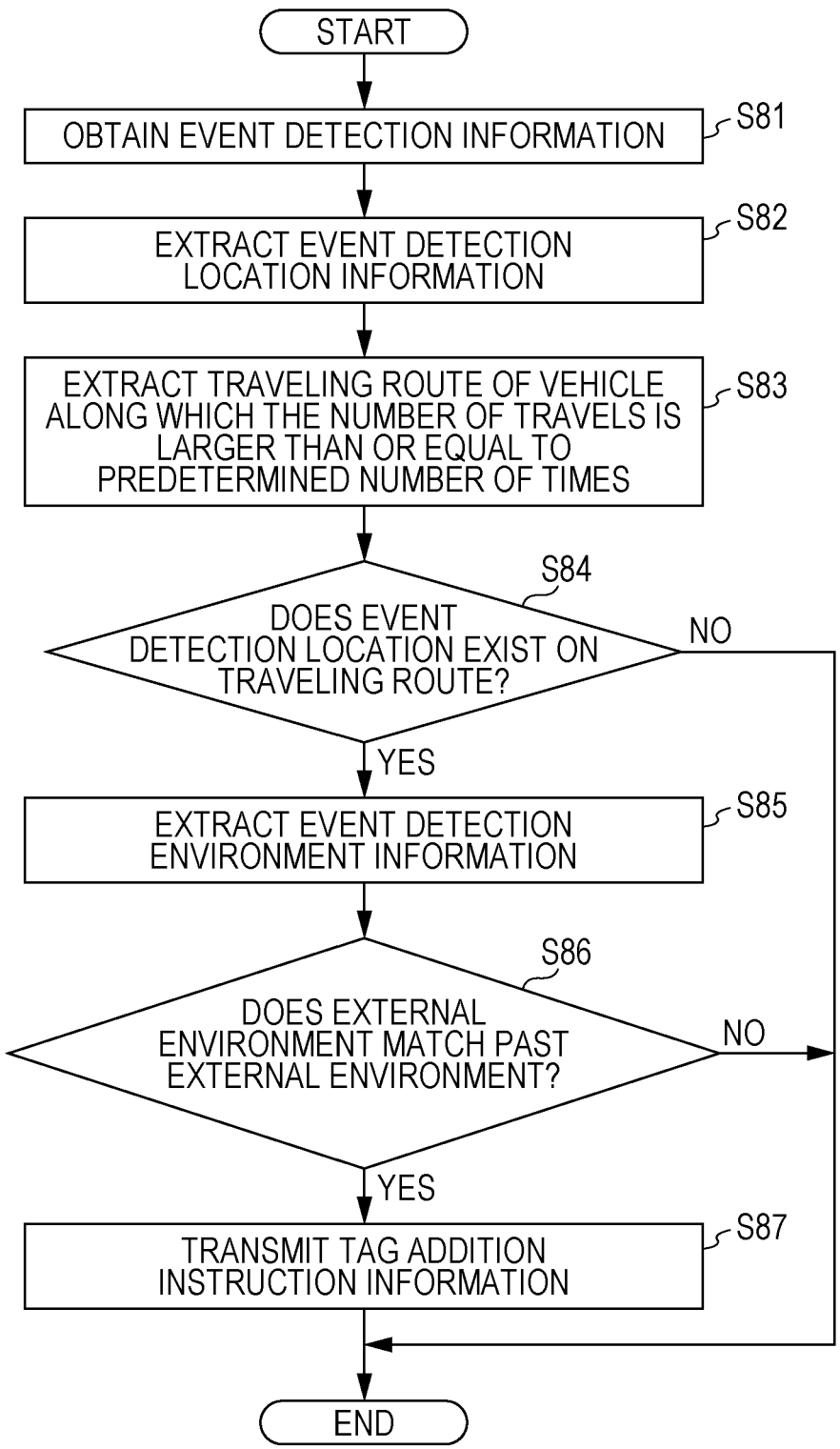
FIG. 18 is a flowchart for describing processing in the management apparatus in the fourth embodiment.

FIG. 18 is a flowchart for describing processing in the management apparatus in the fourth embodiment.

Since processes in steps S81 to S84 illustrated in FIG. 18 are the same as the processes in the processes in steps S11 to S14 illustrated in FIG. 5, descriptions thereof are omitted.

When it is determined in step S84 that the event detection location does not exist on the traveling route of the vehicle 4 (NO in step S84), the processing ends.

On the other hand, when it is determined in step S84 that the event detection location exists on the traveling route of the vehicle 4 (YES in step S84), the external-environment determining unit 125 extracts the event detection environment information from the event detection information obtained by the event-detection information obtaining unit 121 (step S85).

Next, the time-point determining unit 124 determines whether or not the external environment indicated by the event detection environment information matches an external environment when the vehicle 4 passed through the event detection location in the past. In this case, when it is determined that the external environment does not match the external environment when the vehicle 4 passed through the event detection location in the past (NO in step S86), the processing ends.

On the other hand, when it is determined that the external environment matches the external environment when the vehicle 4 passed through the event detection location in the past (YES in step S86), the tag-addition control unit 123 transmit, to the photographic apparatus 2C via the communication unit 11, tag addition instruction information giving an instruction for adding, to the event video-recording information, tag information indicating that photographic data in a predetermined period including the time of the detection of the occurrence of the predetermined event is photographic data showing a dangerous situation (step S87).

Figure 19:
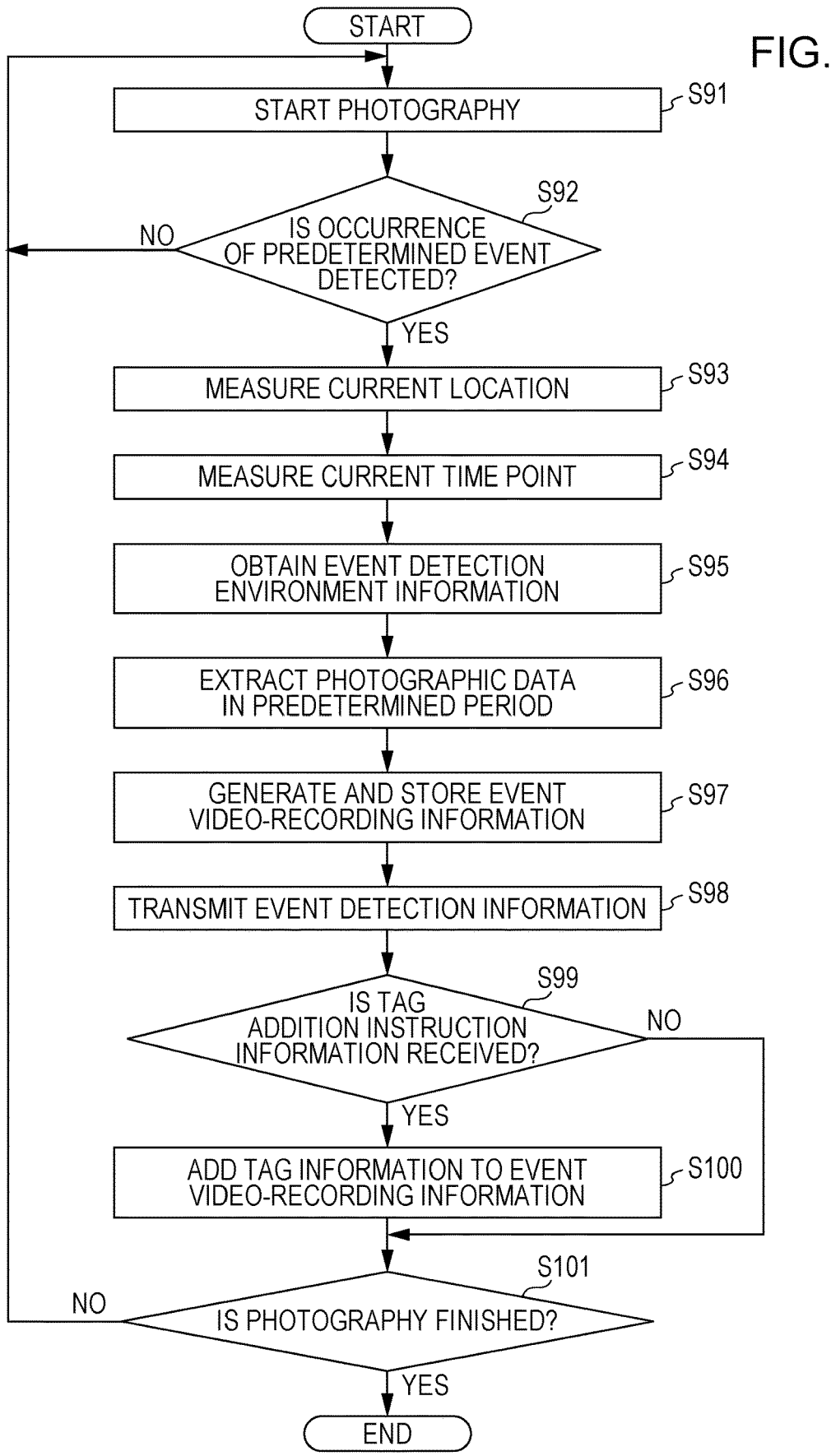
FIG. 19 is a flowchart for describing processing in the photographic apparatus in the fourth embodiment.

FIG. 19 is a flowchart for describing processing in the photographic apparatus in the fourth embodiment.

Since the processes in steps S91 to S94 in FIG. 19 are the same as the processes in steps in S31 and S34 illustrated in FIG. 8, descriptions thereof are omitted.

Next, the environment information obtaining unit 266 obtains the event detection environment information indicating the external environment of the vehicle 4 at the time of detection of occurrence of a predetermined event (step S95).

Since processes in steps S96 and S97 in FIG. 19 are the same as the processes in steps S35 and S36 in FIG. 8, descriptions thereof are omitted.

Next, the event detection information transmission control unit 262C transmits, to the management apparatus 1C via the communication unit 21, event detection information including the event detection location information indicating the location of the vehicle 4 at the time of the detection of the occurrence of the event, the location being measured in step S93, and including the event detection environment information indicating the external environment of the vehicle 4 at the time of the detection of the occurrence of the event, the event detection environment information being obtained in step S95 (step S98).

Since processes in steps S99 to S101 in FIG. 19 are the same as the processes in steps S38 to S40 illustrated in FIG. 8, descriptions thereof are omitted.

Although the system in the present disclosure has been described above based on the embodiments, the present disclosure is not limited to the embodiments. Modes obtained by applying various modifications conceived by those skilled in the art to the embodiments or modes constituted by combining the constituent elements in different embodiments may also be encompassed by the scope of one or more modes of the present disclosure, as long as such modes do not depart from the spirit of the present disclosure.

For example, although an example in which the management apparatus 1 is a server has been described above in each embodiment described above, the management apparatus 1 is not limited thereto. Specifically, the management apparatus 1 may be a terminal device, such as a smartphone as described above.

Also, although an example in which the recording control is tag addition has been described in each embodiment described above, the recording control may be whether or not recording is performed. For example, a recording control unit may be provided instead of the tag-addition control unit 123. The recording control unit may be adapted to record photographic images when the danger determining unit 122 determines that the location indicated by the event detection location information is a location where the driver is estimated to have visited a plurality of times and not to record photographic images when the danger determining unit 122 does not determine that the location indicated by the event detection location information is a location where the driver is estimated to have visited a plurality of times.

In each embodiment described above, each constituent element may be constituted by dedicated hardware or may be realized by executing a software program that suits each constituent element. A program executing unit, such as a CPU or a processor, may read and execute a software program recorded in a recording medium, such as a hard disk or a semiconductor memory, to thereby realize each constituent element.

Some or all of the functions of the apparatuses according to the embodiments of the present disclosure are typically realized as an LSI (Large Scale Integration), which is an integrated circuit. These functions may be individually realized by single chips or may be realized by a single chip so as to include some or all of the constituent elements. Also, implementing the integrated circuit is not limited to LSI and may be realized by a dedicated circuit or a general-purpose processor. An FPGA (Field Programmable Gate Array) that can be programmed after manufacture of an LSI or a reconfigurable processor that allows reconfiguration of connections or settings of circuit cells in an LSI may be utilized.

Also, some or all of the functions of the apparatuses according to the embodiments of the present disclosure may be realized by a processor, such as a CPU, executing a program.

Also, the numbers used in the above description are all exemplary for specifically describing the present disclosure and are not limited to the exemplified numbers.

Also, the order in which the individual steps illustrated in each flowchart described above are executed is exemplary for specifically describing the present disclosure and may be an order other than the above-described order, as long as similar advantages are obtained. Also, one of the above-described steps may be executed concurrently (in parallel) with another step.

In addition, the present disclosure encompasses various modifications obtained by making changes in a scope conceived by those skilled in the art to each embodiment of the present disclosure, as long as such medications do not depart from the spirit of the present disclosure.

The information processing method, the information processing apparatus, and the information processing program according to the present disclosure can efficiently collect photographic images showing abnormal situations and are useful as an information processing method, an information processing apparatus, and an information processing program that perform processing on photographic images resulting from photography using a photographic apparatus installed on a moving body.

What is claimed is:

1. An information processing method comprising:
   obtaining location information indicating a location of a moving body at a time of detection of occurrence of a predetermined event that triggers recording of a photographic image, the photographic image being acquired by photography using a photographic apparatus installed on the moving body;
   determining whether or not the location indicated by the location information is a location where the driver is estimated to have visited a plurality of times, based on at least one of action history information indicating action history of a driver of the moving body and related-person information regarding a related person of the driver; and
   controlling to record the photographic image, according to the determination of whether or not the location indicated by the location information is a location where the driver is estimated to have visited a plurality of times,
   wherein the controlling includes one selected from the group consisting of:
   (i) adding, to the photographic image, a tag indicating that the location is a location where the driver is estimated to have visited a plurality of times, and recording the photographic image, when it is determined that the location indicated by the location information is a location where the driver is estimated to have visited a plurality of times, or
   adding, to the photographic image, a tag indicating that the location is not a location where the driver is estimated to have visited a plurality of times, and recording the photographic image, when it is not determined that the location indicated by the location information is a location where the driver is estimated to have visited a plurality of times;
   (ii) adding, to the photographic image, a tag indicating that the photographic image shows a dangerous situation, and recording the photographic image, when it is determined that the location indicated by the location information is a location where the driver is estimated to have visited a plurality of times, or
   adding, to the photographic image, a tag indicating that the photographic image does not show a dangerous situation, and recording the photographic image, when it is not determined that the location indicated by the location information is a location where the driver is estimated to have visited a plurality of times;
   (iii) recording the photographic image when it is determined that the location indicated by the location information is a location where the driver is estimated to have visited a plurality of times, and
   not recording the photographic image when it is not determined that the location indicated by the location information is a location where the driver is estimated to have visited a plurality of times;
   (iv) transmitting tag-addition instruction information including an instruction to add, to the photographic image, a tag indicating that the location is a location where the driver is estimated to have visited a plurality of times, when it is determined that the location indicated by the location information is a location where the driver is estimated to have visited a plurality of times, or
   transmitting tag-addition instruction information including an instruction to add, to the photographic image, a tag indicating that the location is not a location where the driver is estimated to have visited a plurality of times, when it is not determined that the location indicated by the location information is a location where the driver is estimated to have visited a plurality of times;
   (v) transmitting tag-addition instruction information including an instruction to add, to the photographic image, a tag indicating that the photographic image shows a dangerous situation, when it is determined that the location indicated by the location information is a location where the driver is estimated to have visited a plurality of times, or
   transmitting tag-addition instruction information including an instruction to add, to the photographic image, a tag indicating that the photographic image shows a dangerous situation, when it is not determined that the location indicated by the location information is a location where the driver is estimated to have visited a plurality of times; and
   (vi) transmitting recording instruction information including an instruction to record the photographic image, when it is determined that the location indicated by the location information is a location where the driver is estimated to have visited a plurality of times, or
   transmitting recording instruction information including an instruction not to record the photographic image, when it is not determined that the location indicated by the location information is a location where the driver is estimated to have visited a plurality of times.

2. The information processing method according to claim 1,
   wherein the action history information includes movement history of the moving body; and
   the determination includes determining whether or not the location indicated by the location information is a location through which the moving body has passed a plurality of times in the past, based on the movement history of the moving body.

3. The information processing method according to claim 1,
   wherein the action history information includes a route or destination pre-registered in the moving body; and
   the determination includes determining (i) whether or not the location indicated by the location information is a location that exists on the route or (ii) whether or not the location indicated by the location information is a location that exists within a predetermined range from the destination.

4. The information processing method according to claim 1,
wherein the action history information includes movement history of the driver; and
the determination includes determining whether or not the location indicated by the location information is a location through which the driver has passed a plurality of times in the past, based on the movement history of the driver.

5. The information processing method according to claim 1,
wherein the action history information includes an execution place pre-registered as a place where the driver executed a specific action; and
the determination includes determining whether or not the location indicated by the location information is a location that exists within a predetermined range from the execution place.

6. The information processing method according to claim 1,
wherein the related-person information includes a dwelling place pre-registered as a place where the related person lives; and
the determination includes determining whether or not the location indicated by the location information is a location that exists within a predetermined range from the dwelling place.

7. The information processing method according to claim 1,
wherein the controlling includes classifying and recording the photographic image.

8. The information processing method according to claim 7,
wherein the determination includes at least one of (a) a first determination process that determines whether or not the location indicated by the location information is a location through which the moving body has passed a plurality of times in the past, based on movement history of the moving body, (b) a second determination process that determines whether or not the location indicated by the location information is a location that exists on a route pre-registered in the moving body or whether or not the location indicated by the location information is a location that exists within a predetermined range from a destination pre-registered in the moving body, (c) a third determination process that determines whether or not the location indicated by the location information is a location through which the driver has passed a plurality of times in the past, based on movement history of the driver, (d) a fourth determination process that determines whether or not the location indicated by the location information is a location that exists within a predetermined range from a dwelling place pre-registered as a place where the related person lives, and (e) a fifth determination process that determines whether or not the location indicated by the location information is a location that exists within a predetermined range from an execution place pre-registered as a place where the driver executed a specific action; and
wherein the recording control of the photographic image includes classifying and recording the photographic image for each determination process that is performed, in accordance with at least one determination result of the first determination process, the second determination process, the third determination process, the fourth determination process, and the fifth determination process.

9. The information processing method according to claim 1,
wherein time information indicating a time point at which the occurrence of the predetermined event is detected is obtained;
the action history information includes movement history of the moving body and movement time point of the moving body;
when it is determined that the location indicated by the location information is a location through which the moving body has passed a plurality of times in the past, a sixth determination process that determines whether or not the time point indicated by the time information is included in a passage time segment determined by the movement time point at which the moving body passed through the location in the past is performed; and
the controlling to record the photographic image includes controlling according to the determination and the sixth determination process.

10. The information processing method according to claim 1,
wherein environment information indicating an external environment of the moving body at the time of the detection of the occurrence of the predetermined event is obtained;
the action history information includes movement history of moving body and the external environment when the moving body moved;
when it is determined that the location indicated by the location information is a location where the driver is estimated to have visited a plurality of times, a seventh determination process that determines whether or not the external environment indicated by the environment information matches the external environment when the moving body passed through the location in the past is performed; and
the controlling to record the photographic image includes controlling according to the determination and the seventh determination process.

11. The information processing method according to claim 10,
wherein the environment information includes at least one of information indicating a weather, information indicating whether or not a road through which the moving body passes is congested, or information indicating external brightness of the moving body.

12. An information processing apparatus comprising: a processor; and a memory storing a computer program, which when executed by the processor, causes the processor to perform operations including:
obtaining location information indicating a location of a moving body at a time of detection of occurrence of a predetermined event that triggers recording of a photographic image, the photographic image being acquired by photography using a photographic apparatus installed on the moving body;
determining whether or not the location indicated by the location information is a location where the driver is estimated to have visited a plurality of times, based on at least one of action history information indicating action history of a driver of the moving body and related-person information regarding a related person of the driver; and controlling to record the photographic image, according to the determination of whether or not the location indicated by the location information is a location where the driver is estimated to have visited a plurality of times, wherein the controlling includes one selected from the group consisting of:

(i) adding, to the photographic image, a tag indicating that the location is a location where the driver is estimated to have visited a plurality of times, and recording the photographic image, when it is determined that the location indicated by the location information is a location where the driver is estimated to have visited a plurality of times, or adding, to the photographic image, a tag indicating that the location is not a location where the driver is estimated to have visited a plurality of times, and recording the photographic image, when it is not determined that the location indicated by the location information is a location where the driver is estimated to have visited a plurality of times;

(ii) adding, to the photographic image, a tag indicating that the photographic image shows a dangerous situation, and recording the photographic image, when it is determined that the location indicated by the location information is a location where the driver is estimated to have visited a plurality of times, or adding, to the photographic image, a tag indicating that the photographic image does not show a dangerous situation, and recording the photographic image, when it is not determined that the location indicated by the location information is a location where the driver is estimated to have visited a plurality of times;

(iii) recording the photographic image when it is determined that the location indicated by the location information is a location where the driver is estimated to have visited a plurality of times, and not recording the photographic image when it is not determined that the location indicated by the location information is a location where the driver is estimated to have visited a plurality of times;

(iv) transmitting tag-addition instruction information including an instruction to add, to the photographic image, a tag indicating that the location is a location where the driver is estimated to have visited a plurality of times, when it is determined that the location indicated by the location information is a location where the driver is estimated to have visited a plurality of times, or transmitting tag-addition instruction information including an instruction to add, to the photographic image, a tag indicating that the location is not a location where the driver is estimated to have visited a plurality of times, when it is not determined that the location indicated by the location information is a location where the driver is estimated to have visited a plurality of times;

(v) transmitting tag-addition instruction information including an instruction to add, to the photographic image, a tag indicating that the photographic image shows a dangerous situation, when it is determined that the location indicated by the location information is a location where the driver is estimated to have visited a plurality of times, or transmitting tag-addition instruction information including an instruction to add, to the photographic image, a tag indicating that the photographic image shows a dangerous situation, when it is not determined that the location indicated by the location information is a location where the driver is estimated to have visited a plurality of times; and (vi) transmitting recording instruction information including an instruction to record the photographic image, when it is determined that the location indicated by the location information is a location where the driver is estimated to have visited a plurality of times, or transmitting recording instruction information including an instruction not to record the photographic image, when it is not determined that the location indicated by the location information is a location where the driver is estimated to have visited a plurality of times.

13. A non-transitory recording medium storing a computer program, which when executed by the processor, causes the processor to perform operations including:

obtaining location information indicating a location of a moving body at a time of detection of occurrence of a predetermined event that triggers recording of a photographic image, the photographic image being acquired by photography using a photographic apparatus installed on the moving body;

determining whether or not the location indicated by the location information is a location where the driver is estimated to have visited a plurality of times, based on at least one of action history information indicating action history of a driver of the moving body and related-person information regarding a related person of the driver; and controlling to record the photographic image, according to the determination of whether or not the location indicated by the location information is a location where the driver is estimated to have visited a plurality of times, wherein the controlling includes one selected from the group consisting of:

(i) adding, to the photographic image, a tag indicating that the location is a location where the driver is estimated to have visited a plurality of times, and recording the photographic image, when it is determined that the location indicated by the location information is a location where the driver is estimated to have visited a plurality of times, or adding, to the photographic image, a tag indicating that the location is not a location where the driver is estimated to have visited a plurality of times, and recording the photographic image, when it is not determined that the location indicated by the location information is a location where the driver is estimated to have visited a plurality of times;

(ii) adding, to the photographic image, a tag indicating that the photographic image shows a dangerous situation, and recording the photographic image, when it is determined that the location indicated by the location information is a location where the driver is estimated to have visited a plurality of times, or adding, to the photographic image, a tag indicating that the photographic image does not show a dangerous situation, and recording the photographic image, when it is not determined that the location indicated by the location information is a location where the driver is estimated to have visited a plurality of times;

(iii) recording the photographic image when it is determined that the location indicated by the location information is a location where the driver is estimated to have visited a plurality of times, and not recording the photographic image when it is not determined that the location indicated by the location information is a location where the driver is estimated to have visited a plurality of times;

(iv) transmitting tag-addition instruction information including an instruction to add, to the photographic image, a tag indicating that the location is a location where the driver is estimated to have visited a plurality of times, when it is determined that the location indicated by the location information is a location where the driver is estimated to have visited a plurality of times, or transmitting tag-addition instruction information including an instruction to add, to the photographic image, a tag indicating that the location is not a location where the driver is estimated to have visited a plurality of times, when it is not determined that the location indicated by the location information is a location where the driver is estimated to have visited a plurality of times;

(v) transmitting tag-addition instruction information including an instruction to add, to the photographic image, a tag indicating that the photographic image shows a dangerous situation, when it is determined that the location indicated by the location information is a location where the driver is estimated to have visited a plurality of times, or transmitting tag-addition instruction information including an instruction to add, to the photographic image, a tag indicating that the photographic image shows a dangerous situation, when it is not determined that the location indicated by the location information is a location where the driver is estimated to have visited a plurality of times; and (vi) transmitting recording instruction information including an instruction to record the photographic image, when it is determined that the location indicated by the location information is a location where the driver is estimated to have visited a plurality of times, or transmitting recording instruction information including an instruction not to record the photographic image, when it is not determined that the location indicated by the location information is a location where the driver is estimated to have visited a plurality of times.

* * * * *